United States Patent
Le et al.

(10) Patent No.: US 10,442,330 B2
(45) Date of Patent: Oct. 15, 2019

(54) MONOCOQUE AND SEMI-MONOCOQUE PASSENGER SEATS WITH ERGONOMIC DESIGN

(71) Applicant: Safran Seats USA LLC, Gainesville, TX (US)

(72) Inventors: Nguyen Tien Phuc Le, Arlington, TX (US); Reza Mansouri, Huntington Beach, CA (US); C. Michael Parker, Irvine, CA (US); Jeffrey L. Sikorski, Melissa, TX (US)

(73) Assignee: Safran Seats USA LLC, Gainesville, TX (US)

( * ) Notice: Subject to any disclaimer, the term of this patent is extended or adjusted under 35 U.S.C. 154(b) by 259 days.

(21) Appl. No.: 15/317,527

(22) PCT Filed: Jun. 10, 2015

(86) PCT No.: PCT/US2015/035102
§ 371 (c)(1),
(2) Date: Dec. 9, 2016

(87) PCT Pub. No.: WO2015/191709
PCT Pub. Date: Dec. 17, 2015

(65) Prior Publication Data
US 2017/0158104 A1    Jun. 8, 2017

Related U.S. Application Data

(60) Provisional application No. 62/140,493, filed on Mar. 31, 2015, provisional application No. 62/034,886, (Continued)

(51) Int. Cl.
*B60N 2/68*    (2006.01)
*B60N 2/809*   (2018.01)
(Continued)

(52) U.S. Cl.
CPC ............ *B60N 2/68* (2013.01); *B60N 2/64* (2013.01); *B60N 2/643* (2013.01); *B60N 2/682* (2013.01);
(Continued)

(58) Field of Classification Search
None
See application file for complete search history.

(56) References Cited

U.S. PATENT DOCUMENTS 3,669,496 A  * 6/1972  Chisholm ............... A47C 5/12
                                                297/448.1
4,088,367 A  * 5/1978  Atkinson ............... A47C 5/12
                                                297/183.8
(Continued)

FOREIGN PATENT DOCUMENTS

DE    102004048351 A1    4/2006
DE    202004021894 U1    6/2012
(Continued)

OTHER PUBLICATIONS

International Patent Application No. PCT/US2015/035102, Invitation to Pay Additional Search Fees and Partial International Search Report, dated May 19, 2016.
(Continued)

*Primary Examiner* — David E Allred
(74) *Attorney, Agent, or Firm* — Kilpatrick Townsend & Stockton LLP; Dean W. Russell; Tiffany L. Williams

(57) ABSTRACT

Described are ergonomic passenger seats that may include monocoque or semi-monocoque seat backs, cellular suspension cushions, and tray tables with support arms that may be located within the interior volume of the monocoque or semi-monocoque seat backs when in their stowed positions. The passenger seats offer enhanced passenger comfort and space while providing a lightweight, simple to manufacture design. Monocoque and semi-monocoque seat backs may form integral parts of passenger seats to support additional loads without need for heavy, complex structures. The space within the monocoque or semi-monocoque seat back may then be used for storage or suspension cushions that offer improved comfort with a lighter seat frame. Monocoque and semi-monocoque seat backs may also facilitate the adoption of several other seating mechanisms, such as new seat mounts that allow for improved seat motion that allows for passenger recline with reduced impingement on other passengers' space.

22 Claims, 31 Drawing Sheets

Related U.S. Application Data filed on Aug. 8, 2014, provisional application No. 62/010,213, filed on Jun. 10, 2014.

(51) Int. Cl.
  *B60N 2/64* (2006.01)
  *B60N 2/70* (2006.01)
  *B60N 3/00* (2006.01)
  *B64D 11/06* (2006.01)
  *B60N 2/80* (2018.01)

(52) U.S. Cl.
  CPC ............ *B60N 2/686* (2013.01); *B60N 2/70* (2013.01); *B60N 2/80* (2018.02); *B60N 2/809* (2018.02); *B60N 3/00* (2013.01); *B60N 3/004* (2013.01); *B64D 11/06* (2013.01); *B64D 11/0638* (2014.12); *B64D 11/0649* (2014.12); *Y02T 50/46* (2013.01)

(56) References Cited

U.S. PATENT DOCUMENTS

| | | | | |
|---|---|---|---|---|
| 5,029,942 A * | 7/1991 | Rink | ............ | B60N 2/686 297/452.18 |
| 5,451,071 A * | 9/1995 | Pong | ............ | B62K 3/10 280/274 |
| 5,540,483 A | 7/1996 | Marechal | | |
| 5,951,110 A * | 9/1999 | Conner | ............ | A47C 3/12 297/452.31 |
| 6,142,563 A | 11/2000 | Townsend et al. | | |
| 7,648,201 B2 * | 1/2010 | Eysing | ............ | A47C 7/405 297/284.3 |
| 8,590,126 B2 * | 11/2013 | Kismarton | ............ | A47C 5/00 244/122 R |
| 2002/0043860 A1 | 4/2002 | Dinkel et al. | | |
| 2005/0082896 A1 * | 4/2005 | Gupta | ............ | B60N 2/3013 297/452.65 |
| 2007/0267543 A1 | 11/2007 | Boren et al. | | |
| 2008/0277993 A1 | 11/2008 | Blankart | | |
| 2008/0290715 A1 | 11/2008 | Fullerton et al. | | |
| 2011/0204683 A1 | 8/2011 | Roy et al. | | |
| 2011/0233980 A1 | 9/2011 | Hoshi | | |
| 2011/0241404 A1 | 10/2011 | Di Giusto et al. | | |
| 2014/0197271 A1 * | 7/2014 | Maloney | ............ | B60N 2/4242 244/17.21 |
| 2015/0343929 A1 * | 12/2015 | Yasuda | ............ | B60N 2/646 297/452.18 |
| 2016/0009209 A1 * | 1/2016 | Cao | ............ | B60N 2/58 297/354.12 |
| 2017/0267146 A1 * | 9/2017 | Ferguson | ............ | A47C 5/12 |
| 2018/0099597 A1 * | 4/2018 | Ferguson | ............ | A47C 5/12 |

FOREIGN PATENT DOCUMENTS

| | | |
|---|---|---|
| EP | 0628447 A1 | 12/1994 |
| EP | 1134114 A2 | 9/2001 |
| EP | 2181887 A1 | 5/2010 |
| GB | 2437164 A | 10/2007 |
| WO | 200021783 A1 | 4/2000 |
| WO | 2011041343 A2 | 4/2011 |
| WO | 2015191709 A1 | 12/2015 |

OTHER PUBLICATIONS

International Patent Application No. PCT/US2015/035102, International Search Report and Written Opinion, dated Nov. 30, 2016.

* cited by examiner

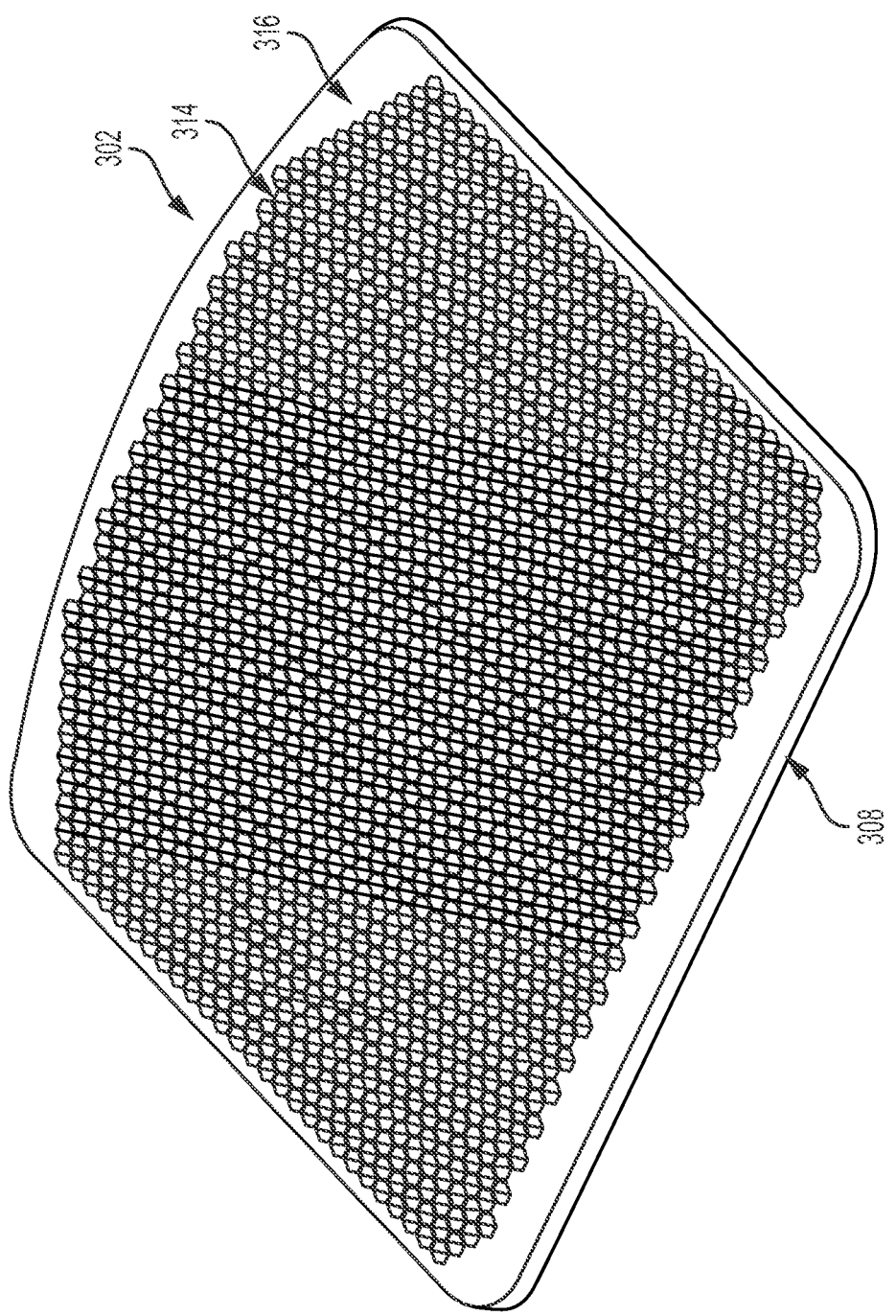

MONOCOQUE AND SEMI-MONOCOQUE PASSENGER SEATS WITH ERGONOMIC DESIGN

CROSS REFERENCE TO RELATED APPLICATIONS

This application is the U.S. national phase entry of International Patent Application Serial No. PCT/US2015/035102 ("the '102 application"), filed on Jun. 10, 2015, which application is related to and claims priority benefits from U.S. Provisional Application Ser. No. 62/010,213 ("the '213 application"), filed on Jun. 10, 2014, entitled "Composite Clamshell Aircraft Seatback", U.S. Provisional Application Ser. No. 62/034,886 ("the '886 application"), filed on Aug. 8, 2014, entitled "Signature Seat", and U.S. Provisional Application Ser. No. 62/140,493 ("the '493 application"), filed on Mar. 31, 2015, entitled "Tray Table for Aircraft Passenger Seat with Concealed Arms". The '102, '213, '886, and '493 applications are hereby incorporated in their entirety by this reference.

FIELD OF THE INVENTION

The field of the invention relates to passenger seats or the like, and more particularly to monocoque construction and ergonomically designed passenger seats.

BACKGROUND

There has been continuous movement in carrier industries, particularly with air carriers, to move towards passenger seats, which are lighter, simpler, and easier to manufacture and assemble. Lighter, more compact seats offer improved fuel economy, increase available payload for passengers and luggage, and allow for extra passenger space in existing seating arrangements or opportunities for more compact seating arrangements while maintaining passenger space at current levels. The passenger seat is also a major design feature and the structure that passengers are most often in contact with during travel. As such, there is a simultaneous push for more visually appealing designs and improved ergonomics and passenger comfort.

Traditional passenger seats are manufactured with internal frames that are covered with cushions and outer panels that provide the seating surface. These seats can be heavy, bulky, and complex to manufacture, thus resulting in standardized designs. As a result, extra features typically are added onto the seat structures instead of being integrated for a more seamless, efficient design. Existing seat structures are normally built up from metal tubes, bars, or stampings, which makes it difficult if not impossible to include complex curvatures that provide enhanced support for varying passenger physiologies.

In some cases, it may be desirable to design a seat based on ergonomic concepts and configured to provide adequate support for passengers that fall within the range of the fifth to ninety-fifth statistical percentile for body size or shape. Compound or anatomically designed curvatures to the seat back and head rest may be designed to not only cradle the passenger during lateral loads, but also to provide support and maintain alignment of the head, neck, and spine. The seat pan or bottom may be designed to provide proper hip alignment and maintain pressure on the tuberosity of the ischium without creating pressure points. In certain cases, the seat structure may incorporate suspension cushions with anisotropic properties so that cushioning and support may be varied in different directions to provide optimal support and comfort to the passenger.

In certain cases, the use of a monocoque or semi-monocoque seat back may facilitate the design of a passenger seat that is lighter, simpler to manufacture, more compact, while still providing excellent passenger comfort and support. In monocoque designs, the outer skin is the primary load-bearing structure. Similarly, a semi-monocoque design uses the outer skin as the primary load-bearing structure, but incorporates additional inner bracing to strengthen the component. Monocoque or semi-monocoque seat structures, particularly seat backs, may provide additional design freedom as compared with traditional seat frame constructions. Monocoque or semi-monocoque seat structures allow for more freedom in aesthetic design, more complex curvatures for ergonomic support, and more internal space that may be used for locating tray tables, storage pockets, and internal passenger suspension cushions, which would otherwise be too bulky or impossible to fit to existing seat structures.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a monocoque seat back may comprise a forward panel, wherein the forward panel may comprise a forward concave face and a forward convex face, an aft panel, wherein the aft panel may comprise an aft concave face and an aft convex face. The forward panel may also comprise a forward panel mating perimeter and the aft panel may comprise an aft panel mating perimeter wherein the forward panel mating perimeter may comprise complimentary geometry to the aft panel mating perimeter and wherein the forward panel mating perimeter may be affixed to the aft panel mating perimeter such that the forward concave face and the aft concave face substantially enclose a volume.

In some embodiments, the forward panel mating perimeter and the aft panel mating perimeter may form a butt joint. The monocoque seat back may further comprise a backing member, wherein the backing member may reinforce the butt joint of the forward panel mating perimeter and the aft panel mating perimeter.

In some embodiments, the forward panel mating perimeter and the aft panel mating perimeter may form a lap joint. In further embodiments, the forward panel mating perimeter and the aft panel mating perimeter may form a splice joint.

In some embodiments, the forward panel mating perimeter and the aft panel mating perimeter form a scarf joint.

In certain embodiments, the monocoque seat back may comprise an internal baffle. The monocoque seat back may comprise an integrated stowage pocket.

In some embodiments, the monocoque seat back may further comprise at least one integrated armrest mounting point.

In some embodiments, the forward panel may comprise a composite. The composite may comprise carbon fiber.

In certain embodiments, the aft panel may comprise a composite. The composite may comprise carbon fiber.

In some embodiments, the monocoque seat back may further comprise a foam fill within the volume.

According to certain embodiments of the present invention, a monocoque seat back may comprise a structural skin with an exterior surface and an interior surface, the interior surface of the structural skin may define a substantially enclosed volume, the exterior surface of the structural skin may be configured to provide the surface geometry of the monocoque seat back, and the structural skin may substantially support any loads imposed on the monocoque seat back.

In certain embodiments, the structural skin may comprise a composite. The composite may comprise carbon fiber.

In some embodiments, the monocoque seat back may further comprise an internal baffle. The monocoque seat back may further comprise an integrated stowage pocket.

In certain embodiments, the monocoque seat back may further comprise a foam fill within the substantially enclosed volume.

In some embodiments, the monocoque seat back may further comprise at least one integrated armrest mounting point.

According to certain embodiments of the present invention, a passenger seat tray table may comprise a tray, a first moveable support arm, and a second moveable support arm wherein the first moveable support arm and the second moveable support arm are pivotally coupled to the seat back pivot pin. The passenger seat tray table may also comprise a seat back pivot pin, wherein the first moveable support arm and the second moveable support arm are pivotally coupled to the seat back pivot pin, at least one stop mechanism fixedly coupled to the seat back pivot pin, wherein the at least one stop mechanism interferes with at least one of the first moveable support arm and the second moveable support arm when the tray table is in a deployed position, and wherein the first moveable support arm and the second moveable support arm are configured to be located within a passenger seat back when the tray table is in a stowed position.

In some embodiments, the at least one stop mechanism may be integrated with the seat back pivot pin.

In certain embodiments, the at least one stop mechanism may comprise a protrusion. In further embodiments, the at least one stop mechanism may comprise a cam.

In certain embodiments, the at least one stop mechanism may comprise a stop pin.

In some embodiments, the first moveable support arm and the second moveable support arm may be located within a monocoque seat back. The at least one stop mechanism may be indexed to the seat back pivot pin.

In certain embodiments, at least one of the first moveable support arm and the second moveable support arm may be pivotally coupled to the seat back pivot pin through a Z-link.

In certain embodiments, the at least one stop mechanism may interfere with the Z-link in the deployed position.

In some embodiments, the stowed position of the tray table may be defined by the passenger seat back. The tray table may be configured to move with the passenger seat back when in the stowed position.

According to certain embodiments of the present invention, an ergonomic passenger seat may comprise a seat back that may comprise a compound seat back curve configured to support a passenger falling within the fifth to ninety-fifth statistical percentile for body size or shape, a seat pan, a flexible bullnose affixed to a forward portion of the seat pan, a headrest that may comprise a compound headrest curve configured to support a passenger head and neck falling within the fifth to ninety-fifth statistical percentile for body size or shape, a first suspension cushion that may be integrated into the sat back, and at least one low-rise spreader.

In certain embodiments, the flexible bullnose may comprise a polymer.

In some embodiments, the at least one low-rise spreader may comprise two motion tracks. The two motion tracks of the at least one low-rise spreader may be sloped in opposite vertical directions.

In certain embodiments, the compound headrest curvature may comprise an occipital pocket.

In certain embodiments, the headrest may translate through a vertical motion. The vertical motion of the headrest may comprise an arcing motion.

In certain embodiments, the headrest may rotate about a horizontal axis.

In some embodiments, the seat back may be fixed with respect to the seat pan. In further embodiments, the seat back and the seat pan may comprise a single load-bearing structure.

In some embodiments, the passenger seat may comprise one or more armrests affixed to the seat back.

In certain embodiments, the two motion tracks of the at least one low-rise spreader may be configured such that the seat pan translates down and forward when the passenger seat transitions from an upright position to a reclined position.

In some embodiments, the first suspension cushion may comprise a cellular material. The cellular material may comprise a variable cell size.

In some embodiments, the cellular material may comprise a variable cell height.

In certain embodiments, the cellular material may comprise a variable cell wall thickness.

In some embodiments, the cellular material may comprise a honeycomb cell. In further embodiments, the cellular material may comprise a square cell.

In some embodiments, the cellular material may comprise a circular cell.

In certain embodiments, the first suspension cushion may comprise silicone.

In some embodiments, the first suspension cushion may comprise a compound curve configured to support the passenger falling within the fifth to ninety-fifth statistical percentile for body size or shape.

In certain embodiments, the passenger seat may further comprise a lumbar support. The lumbar support may be self-adjusting.

In certain embodiments, the seat back may comprise a semi-monocoque structure.

In some embodiments, the seat back may comprise a monocoque structure. The monocoque structure may comprise a forward panel, an aft panel, and a first suspension cushion retaining member.

In some embodiments, the first suspension cushion may be disposed within the monocoque structure.

In certain embodiments, the passenger seat may further comprise at least one aperture in the forward panel of the monocoque structure, wherein the at least one aperture is configured such that a person falling within the fifth to ninety-fifth statistical percentile for body size or shape is at least partially supported by the first suspension cushion.

In some embodiments, the seat pan may comprise a monocoque structure.

In certain embodiments, the passenger seat may further comprise a second suspension cushion, wherein the second suspension cushion is disposed within the monocoque structure of the seat pan.

In some embodiments, the seat pan may comprise a substantially planar support plate, a flexible core material, and a top plate.

In certain embodiments, the seat pan may further comprise at least one aperture in the top plate of the seat pan, wherein the at least one aperture is configured such that a person falling within the fifth to ninety-fifth statistical percentile for body size or shape is at least partially supported by the flexible core material.

In some embodiments, the flexible core material may comprise silicone.

In certain embodiments, the flexible core material may comprise a cellular material.

In some embodiments, the cellular material may comprise a variable cell size. In further embodiments, the cellular material may comprise a variable cell height.

In some embodiments, the cellular material may comprise a variable cell wall thickness. The cellular material may comprise a honeycomb cell.

In some embodiments, the cellular material may comprise a square cell.

In certain embodiments, the cellular material may comprise a circular cell.

According to certain embodiments of the present invention, a passenger seat pan may comprise a substantially planar support plate, a flexible core material that may comprise a honeycomb cellular structure, a top plate that may comprise at least one aperture configured such that a person falling within the fifth to ninety-fifth statistical percentile for body size or shape is at least partially supported by the flexible core material. The substantially planar support plate may comprise the seat pan bottom, the top plate may comprise the sat pan top, the flexible core material may be disposed between the substantially planar support plate and the top plate, and a flexible bullnose may be affixed to the forward portion of the seat pan.

According to certain embodiments of the present invention, a passenger seat back may comprise a monocoque structure that may comprise a forward panel, an aft panel, and a suspension cushion retaining member, and a suspension cushion that may comprise a honeycomb cellular structure. The forward panel may comprise an aperture configured such that a person falling within the fifth to ninety-fifth statistical percentile for body size or shape is at least partially supported by the suspension cushion, and wherein the monocoque structure and the suspension cushion may comprise a compound curve configured to support a passenger falling within the fifth to ninety-fifth statistical percentile for body size or shape.

BRIEF DESCRIPTION OF THE DRAWINGS

FIG. 17 is a perspective view of a cellular cushion.

FIG. 18 is a front elevation view of a cellular suspension cushion.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a monocoque and semi-monocoque seat back, a tray table with tray table arms located within a seat back, and an ergonomic seat. While these structures are described with reference to an airline passenger seat, they are by no means so limited. Rather, embodiments of the monocoque and semi-monocoque seat back, the tray table with tray table arms located within a seat back, and the ergonomic seat may be used in any passenger seat including, but not limited to, automotive, marine, bus, train, or other commercial passenger seats.

Monocoque and Semi-Monocoque Seat Back

Figure 1:
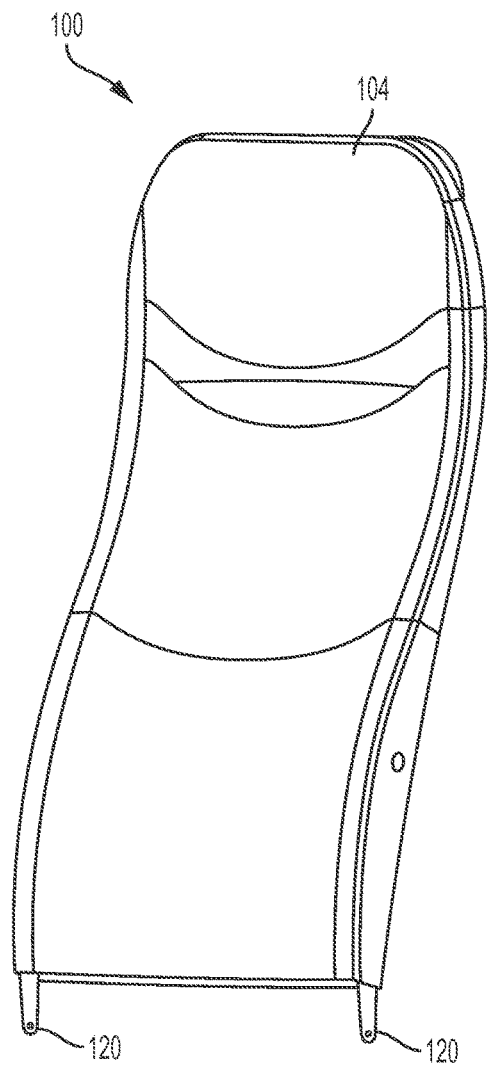
FIG. 1 is a front perspective view of a monocoque seat back.
Figure 2:
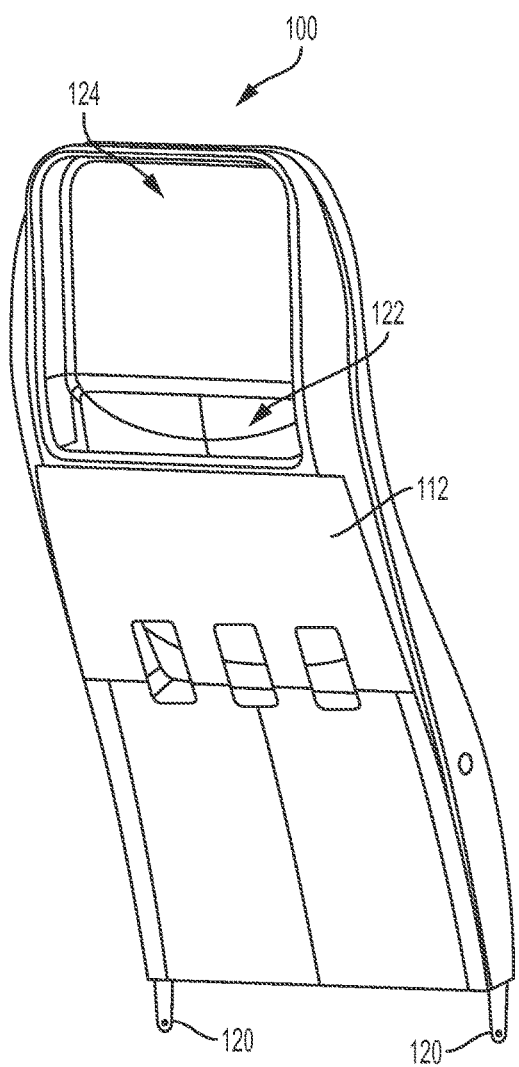
FIG. 2 is a rear perspective view of the monocoque seat back of FIG. 1.

In some embodiments of the present invention, as shown in FIGS. 1 and 2, a monocoque seat back 100 comprises a forward panel 104 affixed to a aft panel 112. The monocoque seat back 100 may be constructed without any internal framing, as the forward panel 104 and aft panel 112 are the main load bearing structures of the monocoque seat back 100. As shown, the forward panel 104 and aft panel 112 may be molded, formed, or otherwise made with complex shapes, curvatures, and structures to provide additional support, attachment points, storage areas, or other features. In certain embodiments, the monocoque seat back 100 may include an integrated stowage pocket 122 and/or an integrated monitor surround 124 formed by the particular shaping and mating of the forward panel 104 and the aft panel 112. Quadrant arms 120 may be integrated with, or affixed to, the monocoque seat back 100 and form part of the attachment of the monocoque seat back 100 to the passenger seat frame and other components (not shown).

Figure 3:
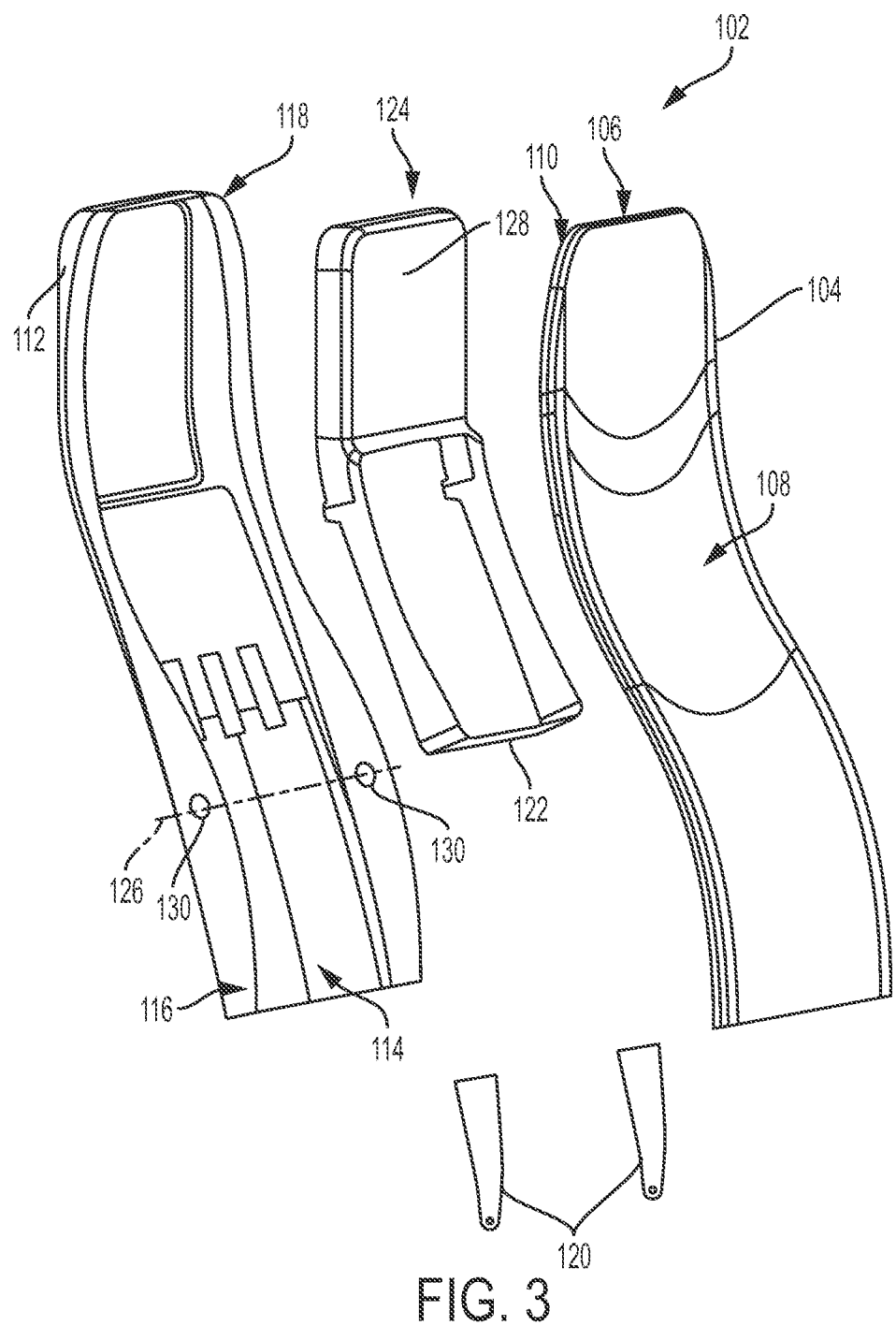
FIG. 3 is an assembly drawing of a semi-monocoque seat back.

FIG. 3 is an exploded view of a semi-monocoque seat back 102 with integrated monitor surround 124 and integrated stowage pocket 122. The monocoque seat back 100 (FIGS. 1 and 2) is similar in design, construction, materials, and assembly to the semi-monocoque seat back 102, with the exception of the internal baffle 128. The semi-monocoque seat back 102 may be comprised of a forward panel 104 and a aft panel 112 with an internal baffle 128 sandwiched between the forward panel 104 and aft panel 112. Quadrant arms 120 may be affixed to either the forward panel 104, aft panel 112, or sandwiched between the forward and aft panels 104, 112. In certain embodiments, the quadrant arms 120 may be formed as an integral part of the forward panel 104, aft panel 112, or internal baffle 128. The internal baffle 128 provides extra stiffness to the semi-monocoque seat back 102, and may be used to provide structure within the enclosed volume of the semi-monocoque seat back 102 and provide additional functionality. In certain embodiments, the internal baffle 128 may form part of the integrated monitor surround 124 and integrated stowage pocket 122.

Still referring to FIG. 3, the forward panel 104 may be shaped to form a concave face 106 and a convex face 108. Along the boundary of the concave face 106 and convex face 108 is a mating perimeter 110. Similarly, the aft panel 112 may also be shaped with a concave face 114 and a convex face 116, which meet at a mating perimeter 118. The mating perimeter 110 of the forward panel 104 may be shaped to be complimentary to the mating perimeter 118 of the aft panel 112. The forward panel 104 may then be joined to the aft panel 112 along a seam between the forward panel mating perimeter 110 and the aft panel mating perimeter 118.

Because the forward panel 104 and aft panel 112 are arranged such that the forward panel concave face 106 and aft panel concave face 114 are arranged towards the interior of the semi-monocoque seat back 102, there is space for the internal baffle 128 to be enclosed within the volume created by the forward and aft panels 104, 112. In certain embodiments, the semi-monocoque seat back 102 or monocoque seat back 100 (FIGS. 1 and 2) may be formed with integrated fixtures, mounting points, or features that would otherwise have to be separately made or attached. As shown in FIG. 3, aft panel 112 is formed with two pivot axis holes 130 through which passes a pivot axis 126. The pivot axis holes 130 may then serve as a bearing surface for a rod or pin that passes through the pivot axis holes 130. This rod or pin (not shown) may then provide a pivot for reclining the semi-monocoque seat back 102, the attachment of armrests (not shown), or other functionalities.

Figure 4:
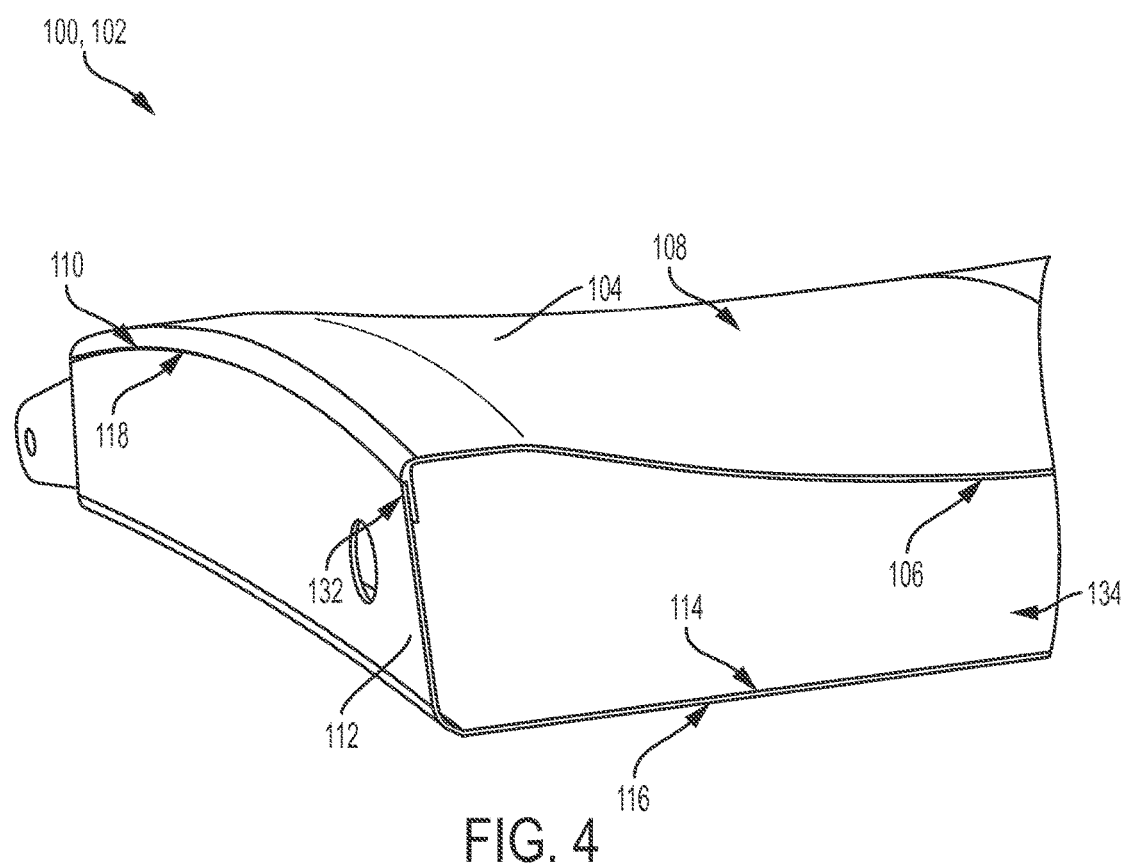
FIG. 4 is a sectional view of a monocoque seat back mating seam.
Figure 5:
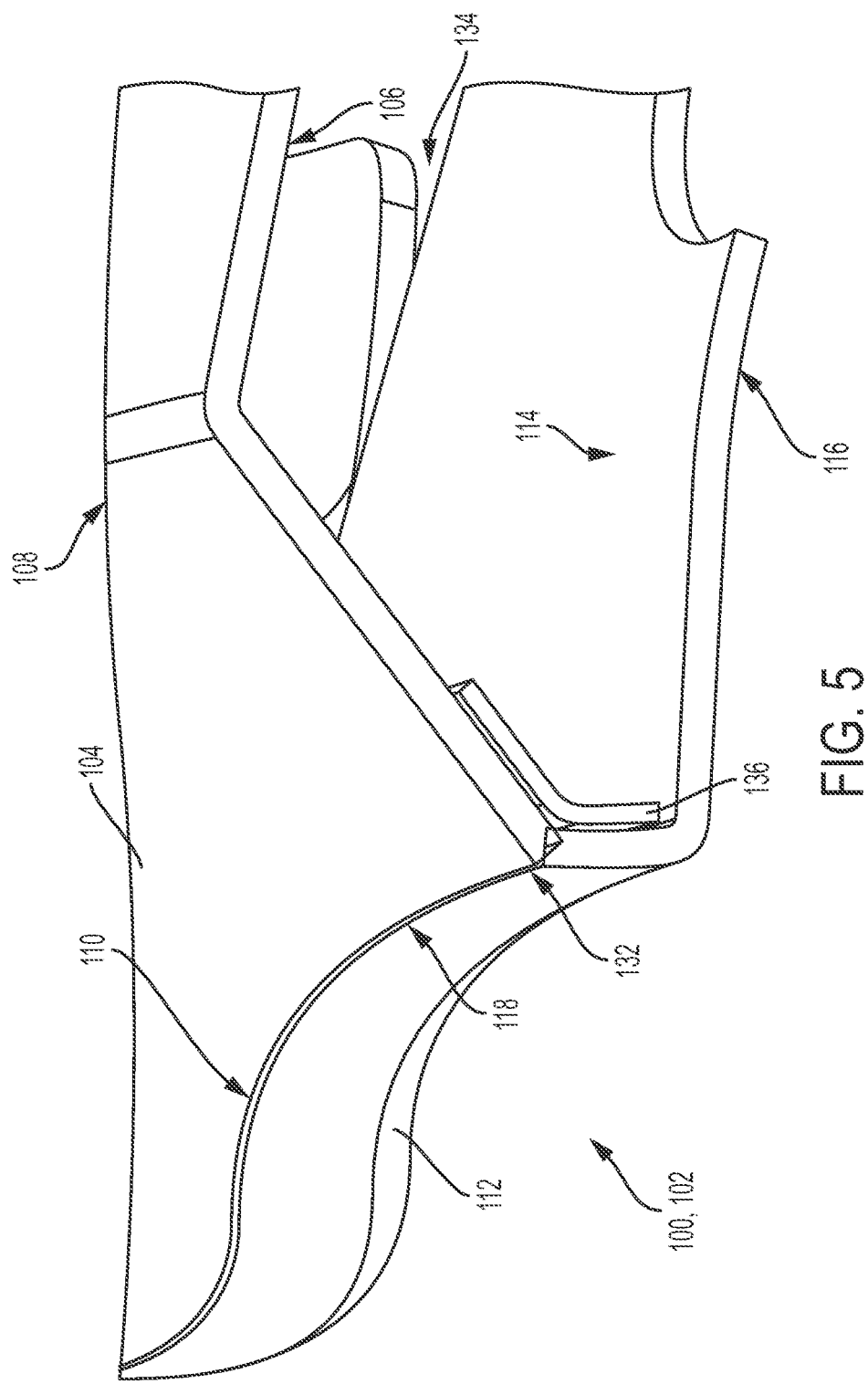
FIG. 5 is a sectional view of a monocoque seat back mating seam.

FIGS. 4 and 5 are a sectional views of a monocoque or semi-monocoque seat back 100, 102 that has been assembled from a forward panel 104 and a aft panel 112. The forward panel 104 comprises a convex face 108 and a concave face 106. Similarly, the aft panel 112 comprises a convex face 116 and a concave face 114. The forward panel concave face 106 and aft panel concave face 114 are disposed towards one another and form the inner portion of the monocoque or semi-monocoque seat back 100, 102. The forward panel 104 and aft panel 112 then enclose an internal volume 134, which may be used for storage or internal wiring. In some embodiments, the internal volume 134 may be filled with a foam or foam-like material to facilitate floating in an emergency, or to provide additional strength to the monocoque or semi-monocoque seat back 100, 102. The forward panel 104 comprises a forward panel mating perimeter 110, which is of complimentary geometry to an aft panel mating perimeter 118. The forward panel mating perimeter 110 may then be joined with the aft panel mating perimeter 118 to form a joint 132 where the forward panel 104 and aft panel 112 are connected to form the monocoque or semi-monocoque seat back 100, 102. In some embodiments, the joint 132 may be reinforced by a backing member 136, which provides additional support to the joint 132 and gives extra area for affixing the forward panel 104 to the aft panel 112.

Still referring to FIGS. 4 and 5, any number of methods of attachment between the forward panel 104 and aft panel 112 may be used to construct monocoque or semi-monocoque seat back 100, 102. For example, the forward panel mating perimeter 110 and aft panel mating perimeter 118 may be joined in a butt joint, a butt joint with a backing member, a scarf joint, a splice joint, and/or any other type of joining arrangement as desired or required for a particular material, manufacturing process, or design. Furthermore, a wide variety of attachment methods may be used to secure the forward panel 104 to the aft panel 112. For example, the joint 132 between the forward panel 104 and the aft panel 112 may be held together or fixed with the use of bonding agents such as, but not limited to, glue, epoxy, adhesives, or the like. The joint 132 may also be fixed using fasteners such as screws, rivets, bolts, or other mechanical connection devices. In certain embodiments, the forward panel 104 and aft panel 112 may be formed with bosses to facilitate a particular means of attachment between the forward and aft panels 104, 112. In some embodiments, the forward and aft panels 104, 112 may be formed with integrated tabs or fittings to allow the panels to snap together with or without the use of fasteners, adhesives, or other joining methods.

Referring to FIGS. 1-3, a monocoque or semi-monocoque seat back 100, 102 may also be formed from a single-piece structural skin. In certain embodiments, the forward panel 104 and aft panel 112 may be formed, molded, or laid up as a single piece, which encloses a volume and provides the structural skin for the monocoque or semi-monocoque seat back 100, 102.

The monocoque or semi-monocoque seat back 100, 102 of FIGS. 1-5 provides a number of advantages and opportunities for unique passenger seat constructions. For example, the monocoque or semi-monocoque seat back 100, 102 provides for a lighter, more compact seat back, and also provides an internal volume 134, which may be used for storage, internal wiring, or the concealment of other components related to or affixed to the passenger seat. The monocoque or semi-monocoque seat back 100, 102 may be molded with attachment points or integrated hardware to facilitate the attachment of arm rests directly to the seat back 100, 102, reduce parts count, or provide extra structural support for the overall seat structure. For example, the monocoque or semi-monocoque seat back 100, 102 may be used as a load bearing structure to support the loads of a seat pan (not shown). A monocoque or semi-monocoque seat back 100, 102 also allows for additional design flexibility for aesthetically pleasing seat designs, as compared to traditional internal frame seat backs. In certain embodiments, the monocoque or semi-monocoque seat back 100, 102 may be preferably made from a variety of materials including, but not limited to, composites, carbon fiber, plastic, metals, or other materials that may be stamped, laid up, molded, or otherwise formed into sheets. In certain embodiments, composites such as carbon fiber may be preferable due to their flexibility in providing different material thicknesses at various locations of the monocoque or semi-monocoque seat back 100, 102.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Tray Table with Tray Table Arms Located within a Seat Back

Figure 6:
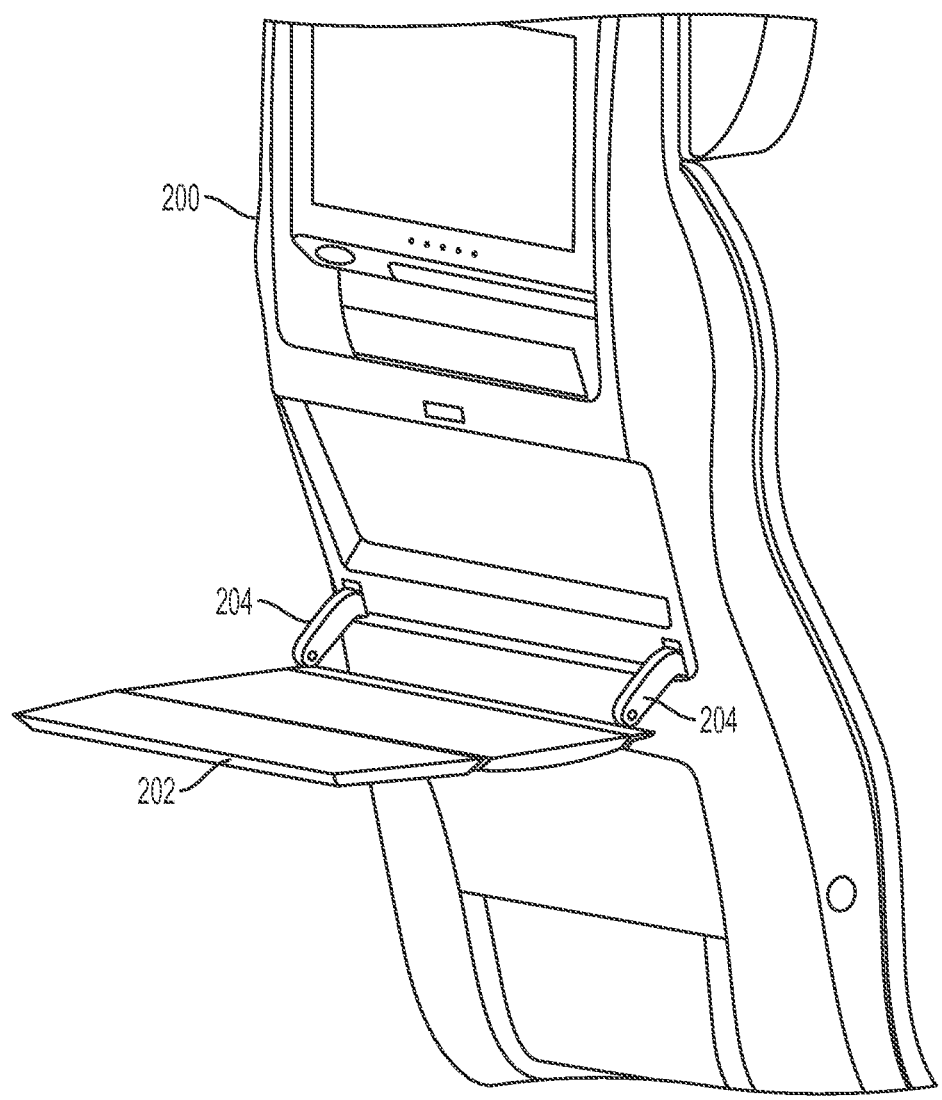
FIG. 6 is a perspective view of a passenger seat back with a tray table in a deployed position.
Figure 7:
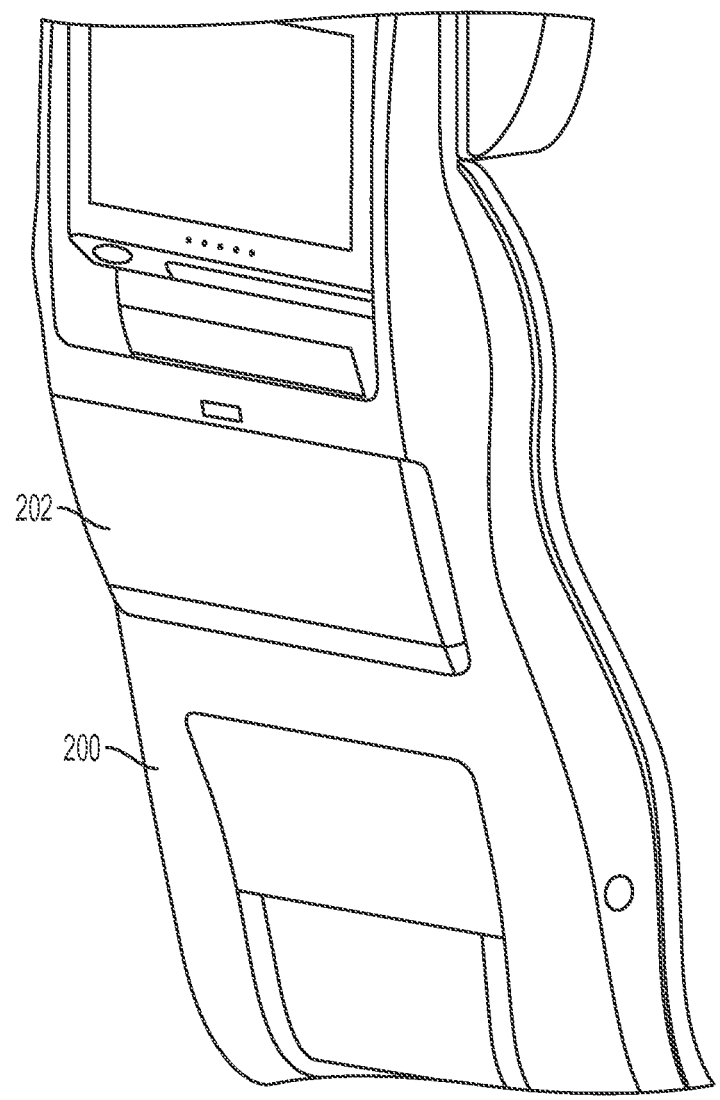
FIG. 7 is a perspective view of a passenger seat back with a tray table in a stowed position.
Figure 8:
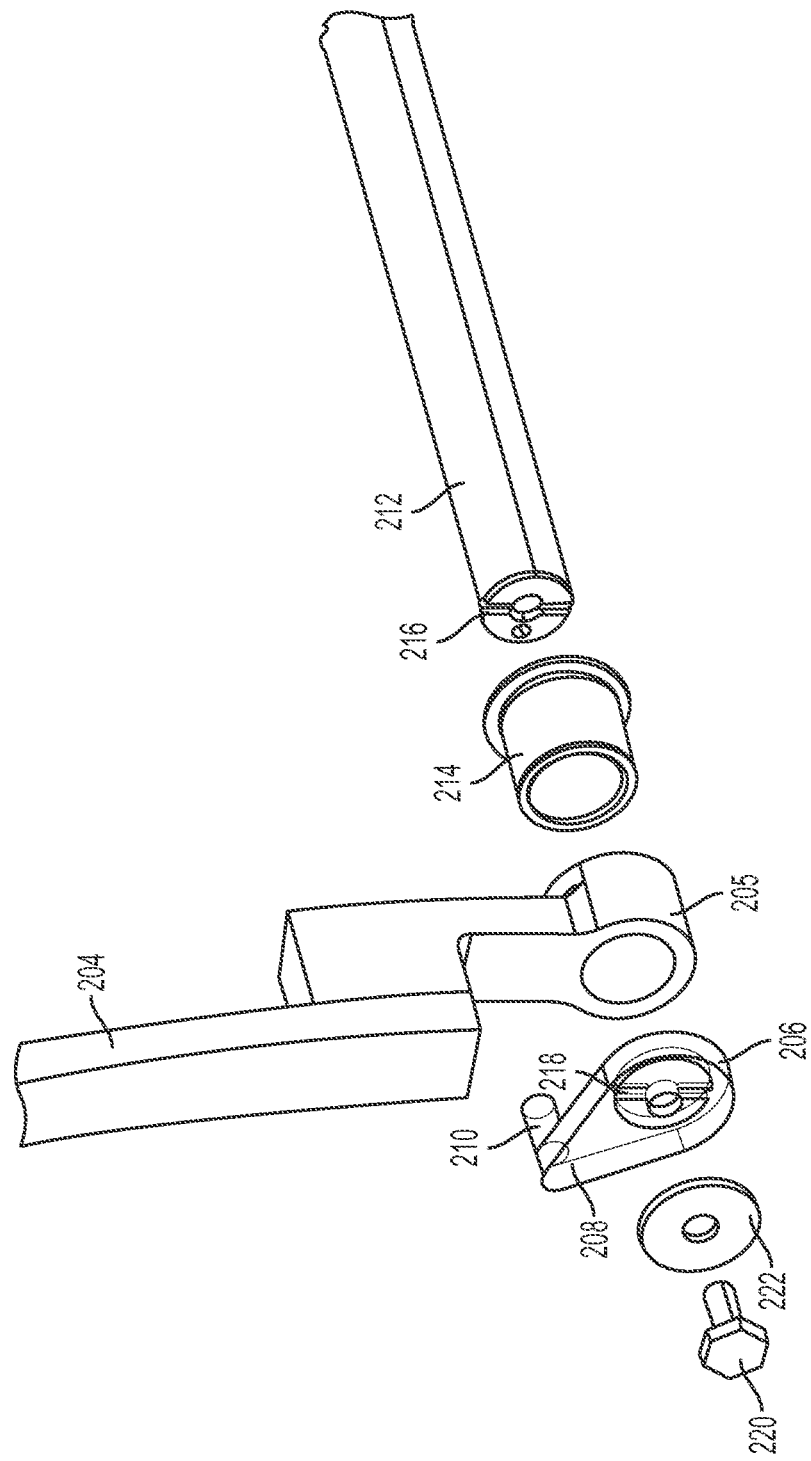
FIG. 8 is an assembly drawing of a tray table stop mechanism.
Figure 9:
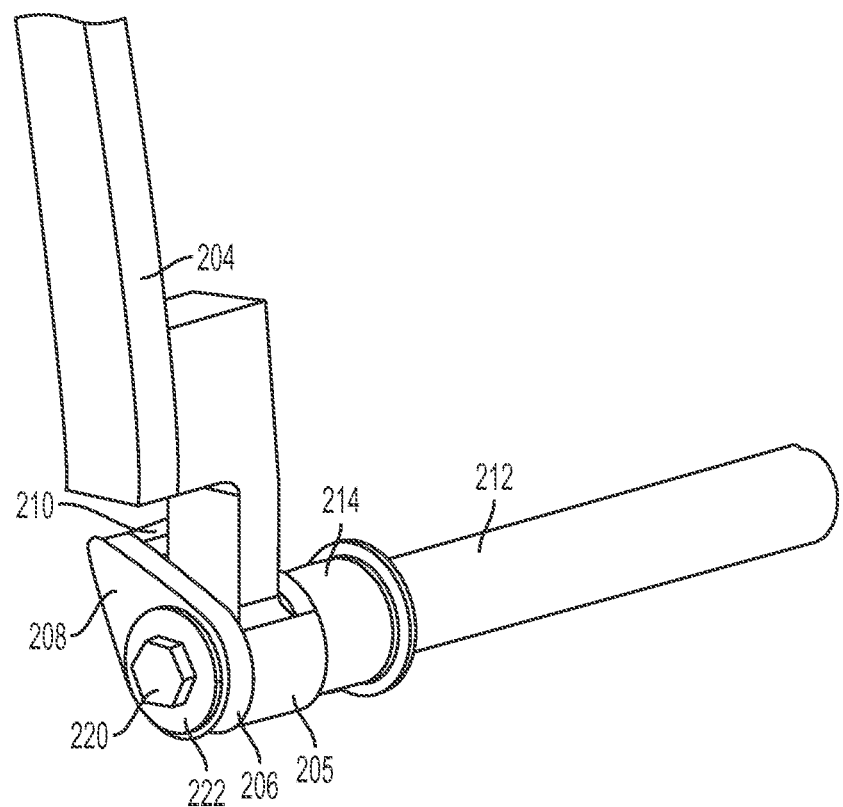
FIG. 9 is a perspective view of a tray table stop mechanism.

In some embodiments of the present invention, as shown in FIGS. 6 and 7, a tray table 202 may be integrated into a seat back 200 such that the tray table arms 204 are only slightly visible in the deployed position (FIG. 6). In the stowed position (FIG. 7), the tray table 202 may be flush with the seat back 200 and the tray table arms 204 and any associated hardware will be located within the seat back 200.

FIGS. 8-11 are perspective views of certain embodiments of the connection between a tray table arm 204 and the seat back pivot pin 212. The tray table arm 204 may include a tray table arm pivot 205, which is coupled to the seat back pivot pin 212 in such a way as to allow rotation of the tray table arm 204 about the seat back pivot pin 212. The seat back pivot pin 212, which may include a groove 216, passes through the tray table arm pivot 205 so that the groove 216 may engage the tongue 218 of the stop mechanism 206. A bolt 220 and washer 222 may be used to affix the stop mechanism 206 to the seat back pivot pin 212. A bushing 214 may be placed between the tray table arm pivot 205 and the seat back pivot pin 212 to facilitate rotation of the tray table arm 204 about the seat back pivot pin 212.

Still referring to FIGS. 8-11, the seat back pivot pin 212 may not rotate due to its connection to the seat, seat back, and/or other structural components (not shown). The tray table arm 204, which is connected to the seat back pivot pin 212 through the tray table arm pivot 205 and optional bushing 214, is free to rotate about the seat back pivot pin 212. The stop mechanism 206, which may include an optional protrusion 208 and/or pin 210, is indexed to the seat back pivot pin 212 by the engagement of the tongue 218 into the groove 216 and may not rotate with respect to the seat back pivot pin 212. The free rotation of the tray table arm 204 and fixation of the stop mechanism 206 provides for a relative rotational movement between the tray table arm 204 and the stop mechanism 206.

Figure 10:
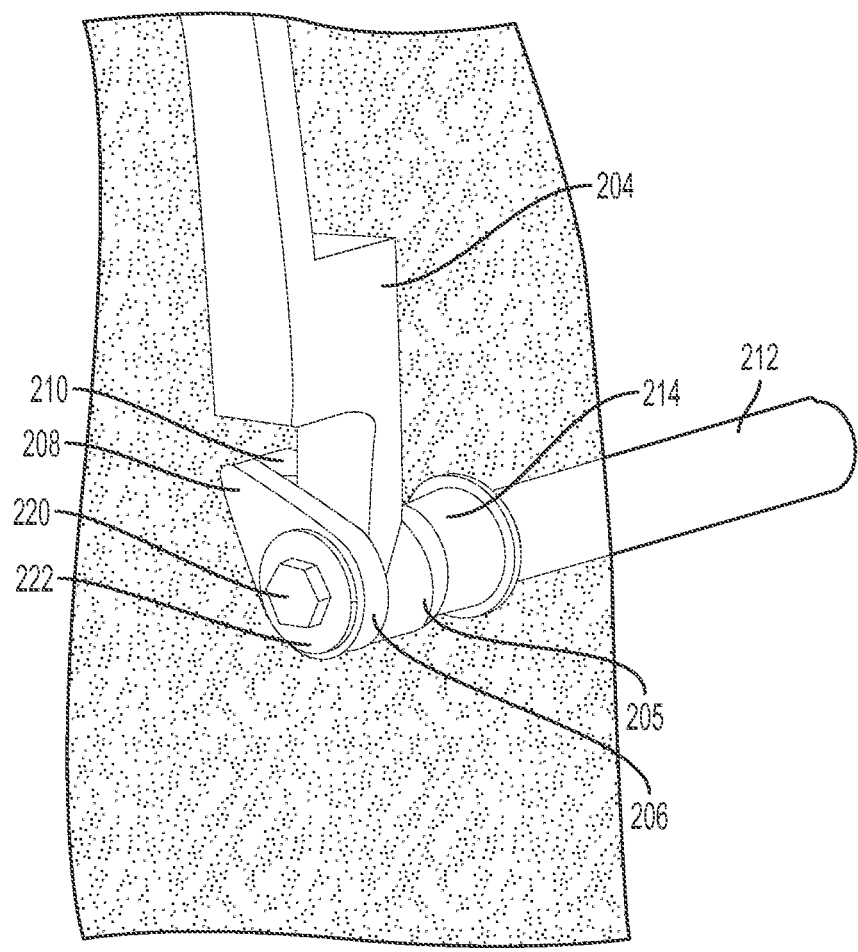
FIG. 10 is a perspective view of a tray table stop mechanism in a stowed position.
Figure 11:
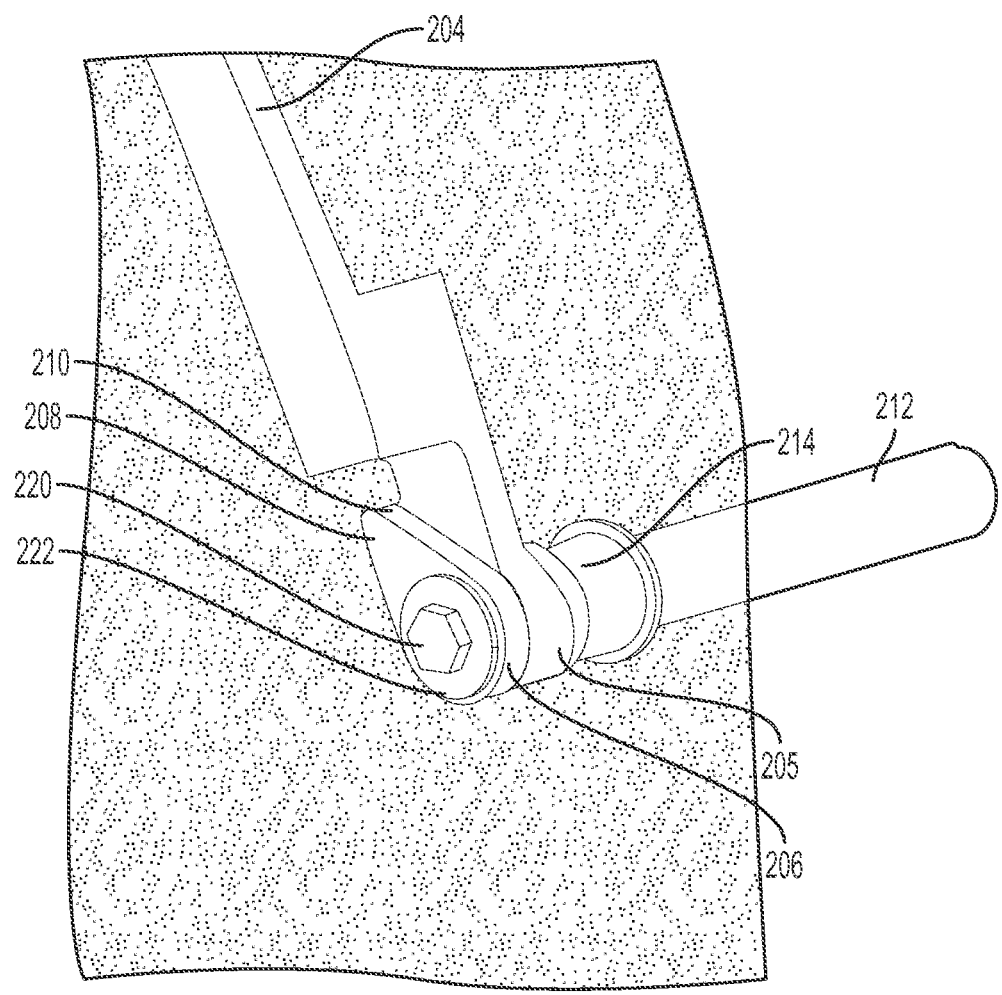
FIG. 11 is a perspective view of a tray table stop mechanism in a deployed position.

Referring to FIGS. 10 and 11, the tray table arm 204 may move between stowed (FIG. 10) and deployed (FIG. 11) positions. As the tray table arm 204 rotates between its stowed and deployed positions, stop mechanism 206, stop mechanism protrusion 208, and/or stop mechanism pin 210 may interfere with the motion of the tray table arm 204. In the deployed position (FIG. 11), the stop mechanism 206, stop mechanism protrusion 208, and/or stop mechanism pin 210 may stop the motion of the tray table arm 204 to define the limit of motion in the deployed position.

Figure 12:
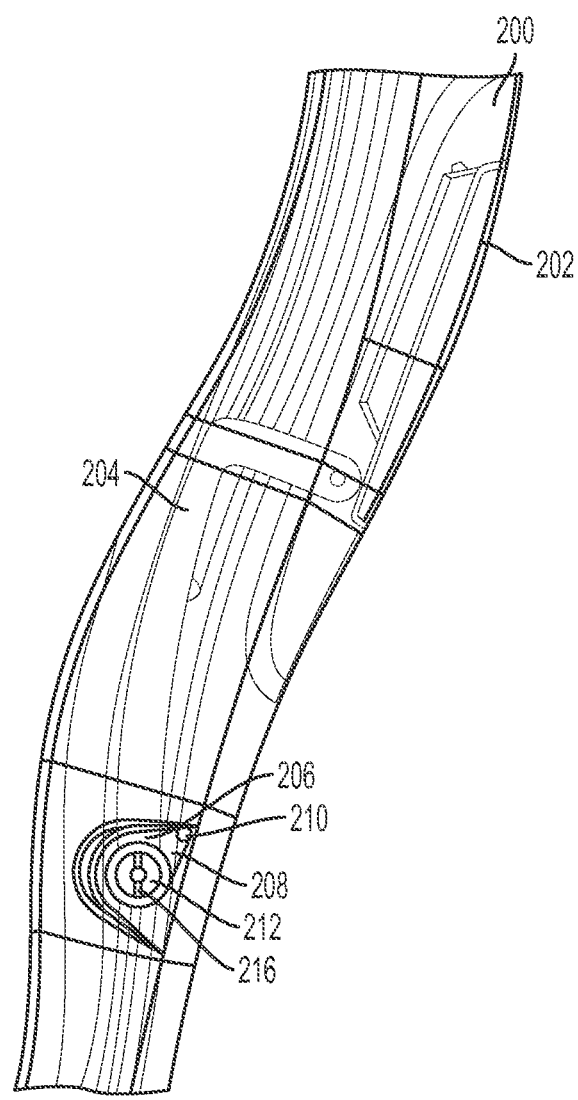
FIG. 12 is a side elevation view of a tray table in a stowed position.
Figure 13:
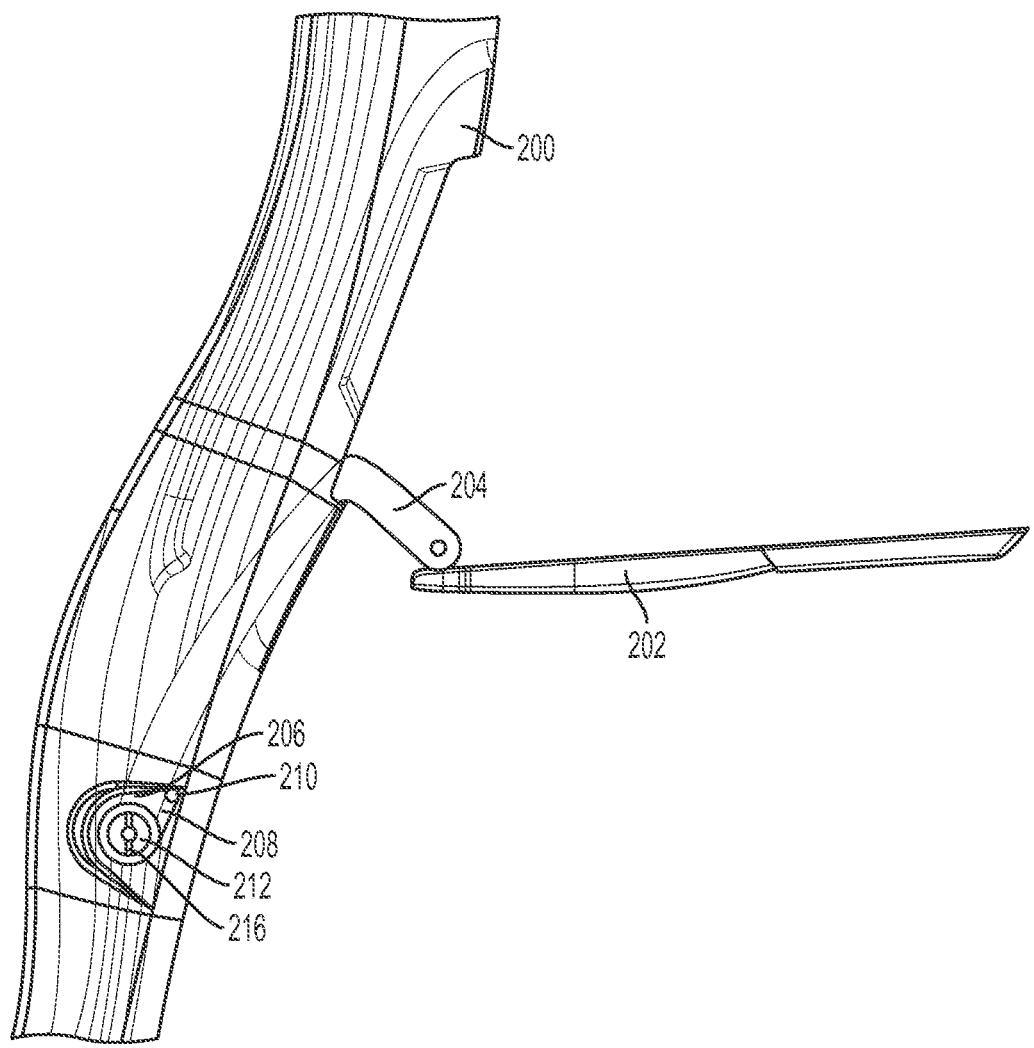
FIG. 13 is a side elevation view of a tray table in a deployed position.

FIGS. 12 and 13 are transparent side views of a tray table 202 located within a seat back 200 in stowed and deployed positions, respectively. The tray table 202 is pivotally coupled to the tray table arms 204. The tray table arms 204 may then be pivotally coupled to the seat back pivot pin 212 as described in FIGS. 8-11 above. The stop mechanism 206, which is indexed to the seat back pivot pin 212 by groove 216, may include protrusion 208 and pin 210. The relative angle of groove 216 on seat back pivot pin 212 locates the stop mechanism 206 and the protrusion 208 and pin 210. In the stowed position (FIG. 12), the tray table arm 204 does not contact the stop mechanism 206, protrusion 208, or pin 210. The tray table arm 204 may freely rotate about the seat back pivot pin 212 in the stowed position. While the tray table 202 is stowed, the seat back 200 defines the closed position of the tray table 202. Furthermore, the seat back 200 rotates about the seat back pivot pin 212 during recline, so the tray table 202, tray table arms 204, and seat back 200 will move as a single unit when the tray table 202 is in the stowed position. In the deployed position (FIG. 13), the rotation of the tray table arm 204 is interfered with by the pin 210. The location of the pin 210 is selected so that the tray table arm 204 does not rotate about the seat back pivot pin 212 so far as to contact the seat back 200. In the deployed position, the load of the tray table 202 and tray table arm 204 is supported by the stop mechanism 206, protrusion 208, and/or pin 210. Because the tray table arm 204 is stabilized by the stop mechanism pin 210 and does not contact the seat back 200, the seat back 200 may freely move between its upright and reclined positions without disturbing the tray table 200.

Figure 14:
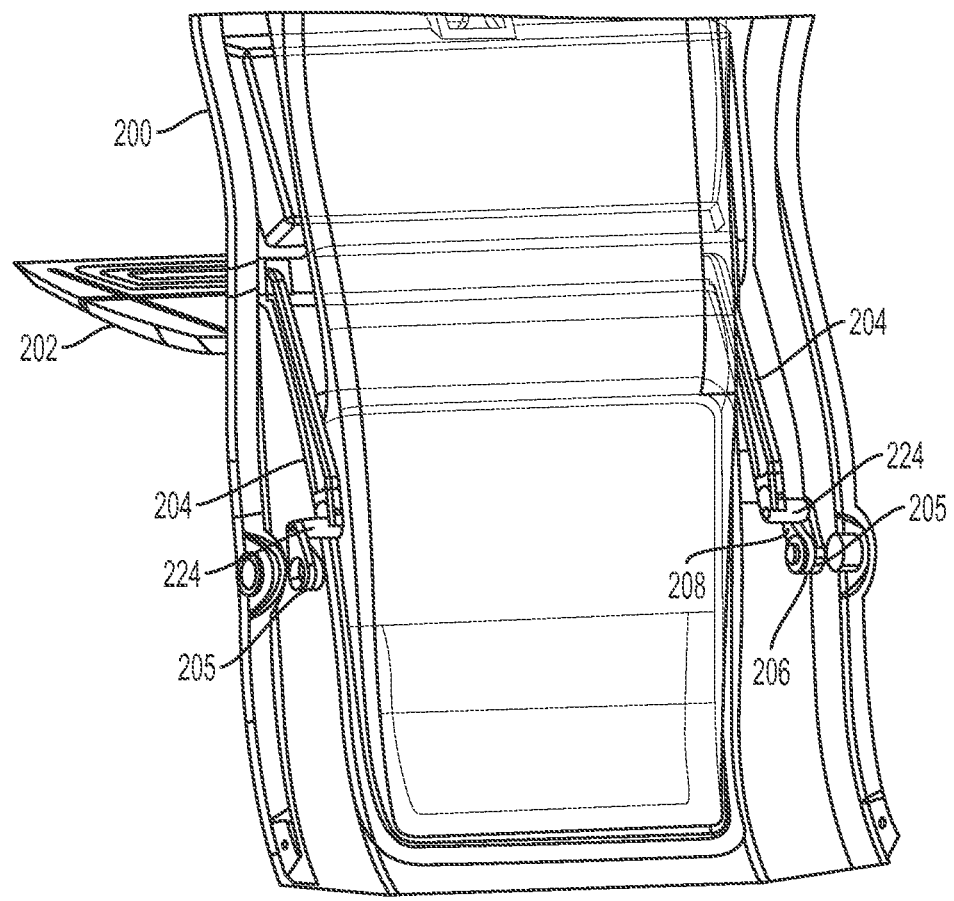
FIG. 14 is a perspective view of a tray table in a deployed position.
Figure 15:
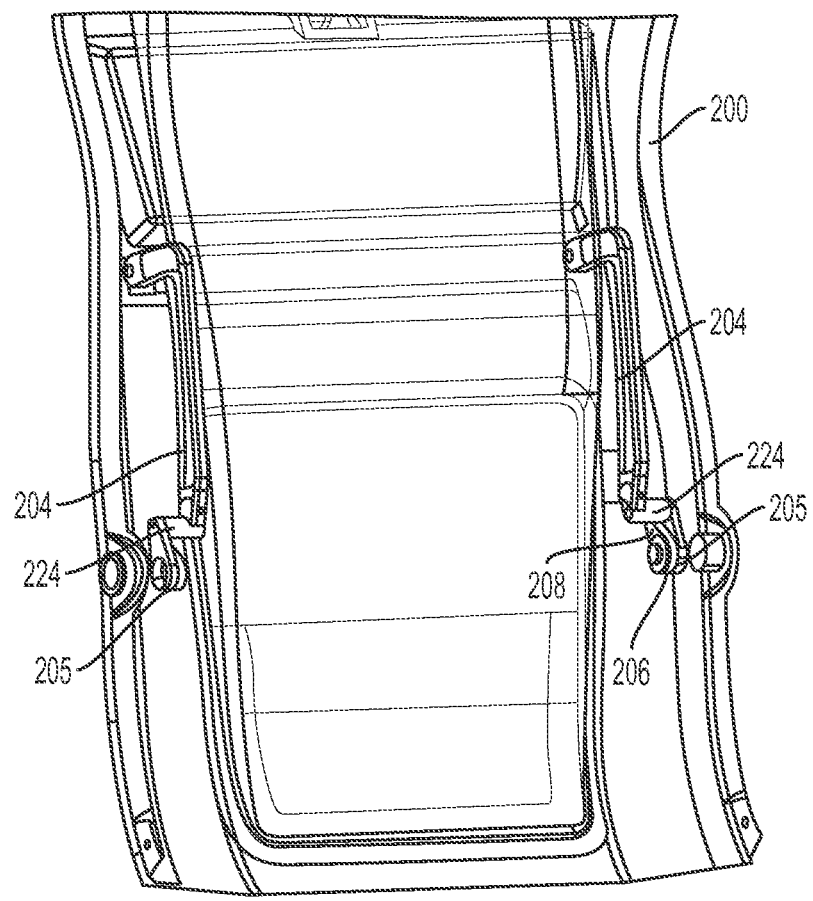
FIG. 15 is a perspective view of a tray table in a stowed position.

FIGS. 14 and 15 are transparent front views of a seat back 200 with a concealable tray table 202 in the deployed and stowed positions, respectively. The tray table 202 is pivotally coupled to the tray table arms 204, which are coupled to the seat back pivot pin (not shown) through z-links 224. In certain embodiments, the tray table arm pivot 205 may be integrated into the z-links 224 and allow for rotation of the z-links 224 and tray table arms 204 about the seat back pivot pin. A stop mechanism 206 with a protrusion 208 is fixedly attached to the seat back pivot pin. As the tray table arms 204 move from a stowed position to a deployed position, the z-link 224 will rotate towards the stop mechanism 206 and protrusion 208. The protrusion 208 will interfere with the z-link 224 and restrict the motion of the tray table arms 204 beyond this interference point. The interference point should be chosen such that the tray table arms 204 are stopped by the protrusion 208 at the deployed position without contact between the tray table arms 204 and the seat back 200. The tray table 202 and seat back 200 will then rotate about the seat back pivot pin independently, allowing the seat back 200 to recline without disturbing the tray table 202 when it is in the deployed position. When the tray table 202 is in the stowed position, the tray table arms 204 and seat back 200 will share a common axis of rotation about the seat back pivot pin, and will move together as a unit when the seat back 200 moves between reclined and upright positions.

In certain embodiments, the tray table 202 and tray table arms 204 of FIGS. 6-15 may be adapted for use with a monocoque or semi-monocoque seat back. The monocoque or semi-monocoque design may provide for additional space within the seat back 200 to locate the tray table arms 204, stop mechanism 206, and any associated hardware. In some embodiments, the stop mechanism 206 may be integrated into the seat back pivot pin or other components of the seat assembly, such as the spreader. The stop mechanism 206 may also be equipped with a set screw or adjustment device to allow for regulation of the clearance between the seat back 200 and tray table arms 204 in the deployed position. In still other embodiments, the motion of the tray table arms 204 may be regulated by any fixed component, which interferes with the tray table arms 204 in their deployed position and allows for the tray table arms 204 to rotate about the same axis as the seat back 200.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Suspension Cushion and Cellular Cushion

Figure 16:
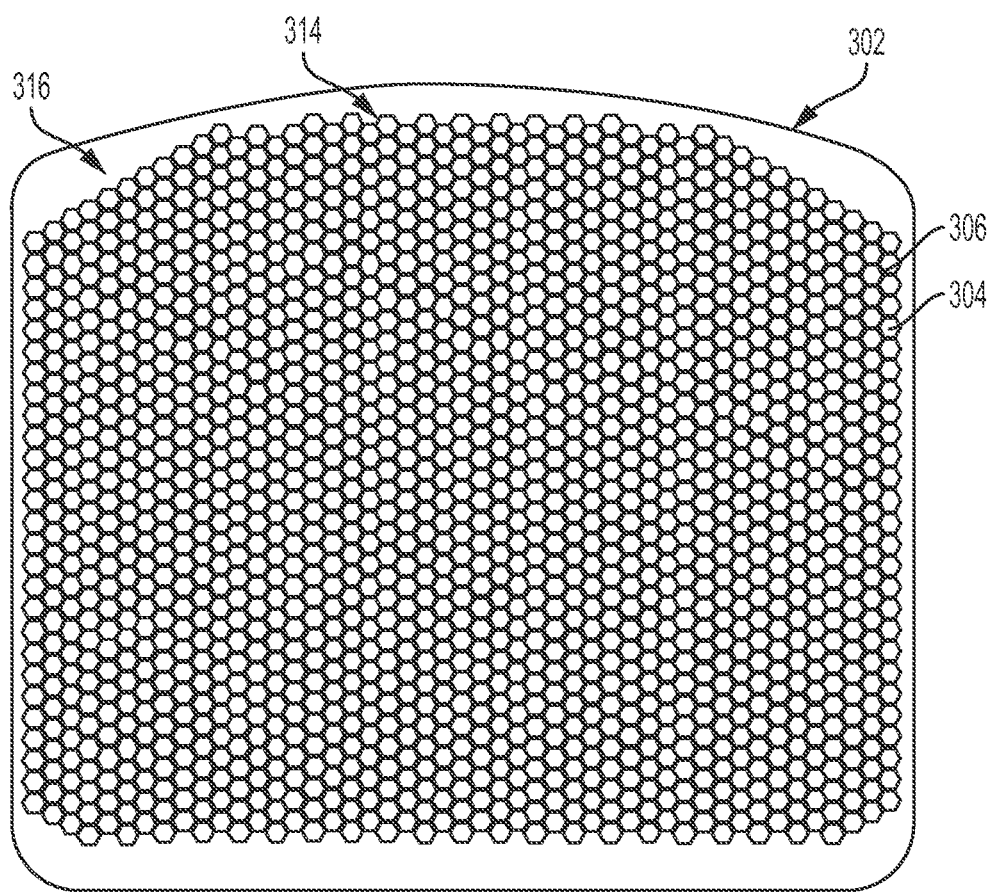
FIG. 16 is a plan view of a cellular cushion.

In certain embodiments of the present invention, as shown in FIGS. 16 and 17, a cellular cushion 302 comprises a cellular area 314 and a solid area 316. The cellular area 314 is made up of a plurality of cells 304 that are defined by cell walls 306. The cells 304 of the cellular area 314 allow for the cellular cushion 302 to have a combination of properties, including anisotropic cushioning and stretch properties. For instance, by varying the size and shape of the cells 304 or the cell wall 306 thickness, the cellular cushion 302 may have its properties tailored to a specific application. The cellular cushion 302 also comprises a thickness 308, which may be increased or decreased to vary the amount of cushion, support, or strength of the overall cellular cushion 302.

Still referring to FIGS. 16 and 17, the properties of the cellular cushion 302 may be varied across the area of the cellular cushion, as well. For instance, one portion of the cellular area 314 of the cellular cushion 302 may have very small cells 304, or thicker cell walls 306 to increase the relative stiffness of that area of the cellular cushion 302 compared to another area with larger cells 304 and/or thinner cell walls 306. Similarly, the stiffness of the cellular cushion 302 may vary depending on the direction of force applied to the cellular cushion 302. In certain embodiments, the stiffness or compliance of the cellular cushion 302 to a force applied perpendicular to the thickness 308 may be different than the stiffness or compliance of the cellular cushion 302 to a force applied in the plane of the thickness 308 of the cellular cushion 302.

Figures 18A, 18B:
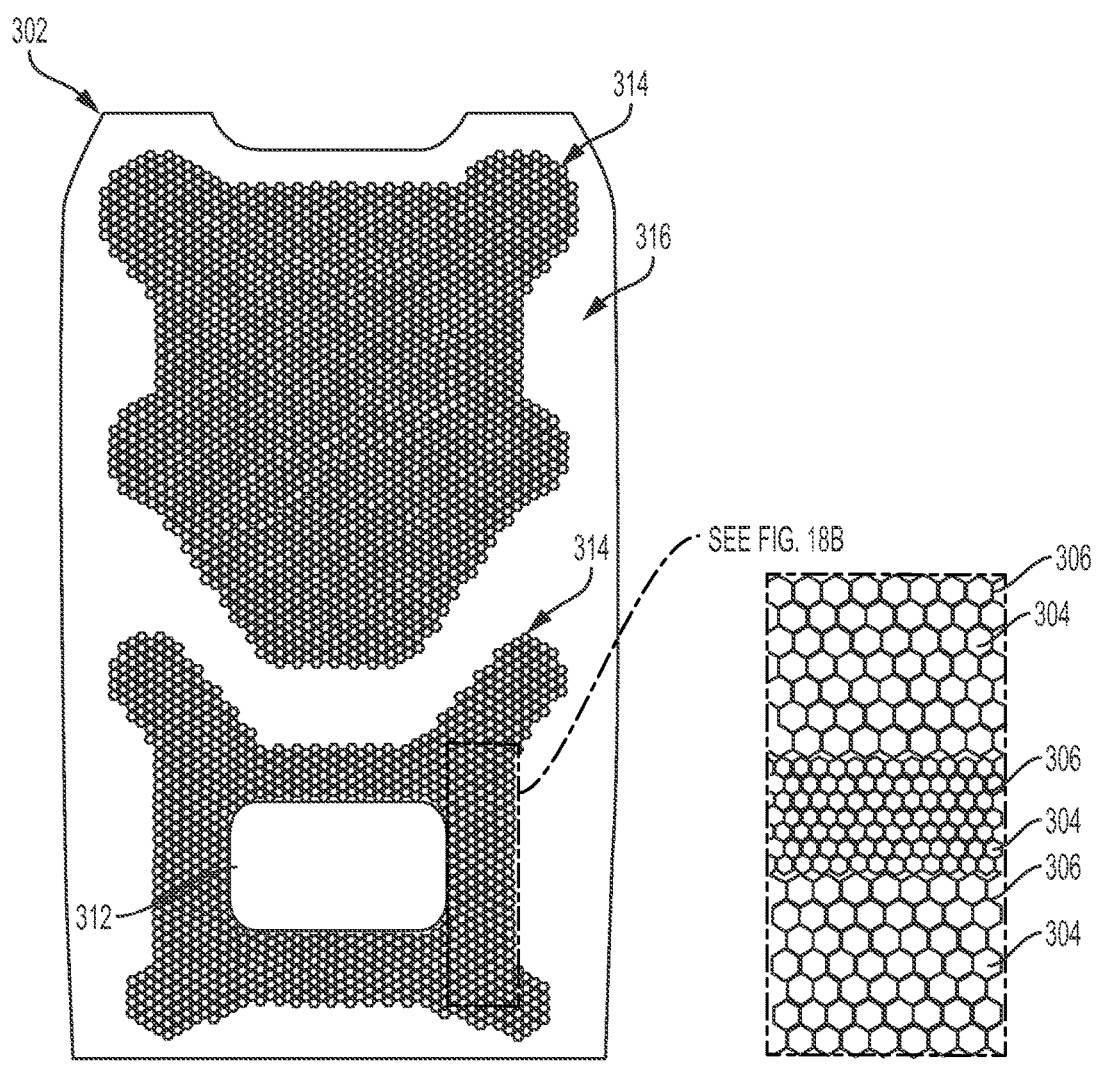
FIG. 18A is an enlarged view of the cellular structure of the cellular suspension cushion of FIG. 18.
Figure 19:
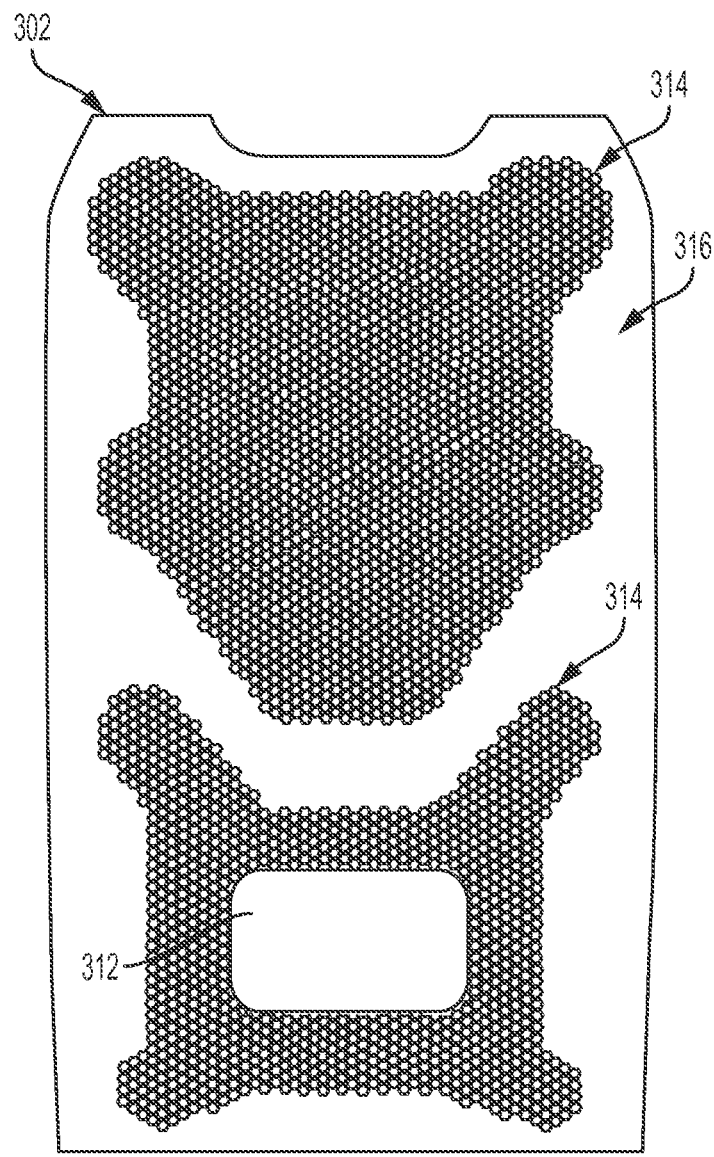
FIG. 19 is a front elevation view of a cellular suspension cushion.
Figure 20:
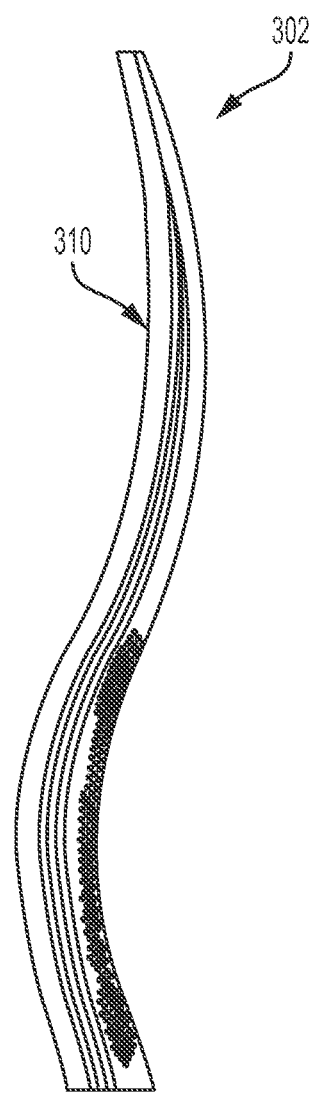
FIG. 20 is a side elevation view of a cellular suspension cushion.

FIGS. 18-20 are front and side views of a cellular cushion 302 comprising a cellular area 314 and a solid area 316. The cellular area 314 comprises cells 304 defined by cell walls 306. As shown in FIG. 18A, the cells 304 may be configured with different cell sizes and/or different thicknesses of the cell walls 306 at different points of the cellular cushion 302 to provide varying degrees of cushion, stiffness, and/or flexibility. Varying the size of the cells 304, their arrangement, and the thickness of the cell walls 306 may also be used to alter the amount of cushion, stiffness, and/or flexibility in different directions to provide enhanced comfort for a passenger.

Still referring to FIGS. 18-20, the cellular cushion 302 may comprise a lumbar support 312 configured to provide additional cushioning and support for a passenger. The lumbar support 312, which may be a passive pad or an inflatable bladder, is located within the cellular area 314 of the cellular cushion 302. The cellular area 314 may have specific sizing of the cells 304 and cell walls 306 to provide for passive alignment of the lumbar support 312 so that it may self-position to fit persons falling within the fifth to ninety-fifth statistical percentile for body size or shape. In certain embodiments, the cellular area 314 around the lumbar support 312 may be configured to only slightly resist vertical or horizontal movement of the lumbar support 312 as a passenger sits on the cellular cushion 302. However, while the cellular area 314 allows vertical and horizontal translation of the lumbar support 312, it may provide a higher level of support or resistance in a direction perpendicular to the lumbar support 312. In some embodiments, the shape of the cells 304 may also be changed to provide different cushioning properties. Hexagonal, circular, and/or square shaped cells 304 may be used. In certain embodiments, other shapes, both regular and irregular, may be used to change or optimize the properties of the cellular cushion 302.

The cellular cushion 302 may be formed as a flat or planar sheet, or it may be molded, formed, or otherwise manufactured with curved or irregular shapes. FIG. 20 shows a side view of a cellular cushion 302 with a spinal curve 310 adapted for use in a passenger seat back. The spinal curve 310 may be a complex curve along both the length and width of the cellular cushion 302, and may be configured to attempt to fit the largest number of body shapes, sizes, and/or types. In some embodiments, the shape of the spinal curve 310 may be configured to fit persons who fall within the fifth to ninety-fifth statistical percentile for body size or shape. Similarly, the cellular area 314 may be shaped or otherwise configured to provide cushioning adapted to a wide variety of body types. In certain embodiments, the cellular 314 area may be patterned to cushion particular pressure points or to fit a majority of passengers. In some embodiments, the cellular area 314, as with the spinal curve 310, may be determined by a statistical analysis of body types, and then configured to fit people that fall within the fifth to ninety-fifth statistical percentile for body size or shape. As used in anthropometrics and throughout this disclosure, the fifth to ninety-fifth statistical percentile for body size or shape refers to a range on a Gaussian curve, which may be plotted as a bell-shaped curve on a graph. This curve may vary depending on the particular data set consulted or used, such as with a commercial anthropometric database. For example, the statistical range may vary depending on whether it is applicable to males or females. In some cases, the statistical range may include all body sizes or shapes that fall within the range of a fifth percentile female to a ninety-fifth percentile male.

Referring to FIGS. 16-20, a cellular cushion may offer a number of improvements or advantages over alternative supporting methods. The cellular cushion 302 allows for airflow through the cells 304 and around the back of the passenger to reduce heat and the buildup of moisture around the passenger. The cellular cushion 302 may also provide for a lighter, more compact seating arrangement. In certain embodiments, the cellular cushion 302 may be suspended within a seat back such that only the perimeter of the cellular cushion 302 is attached. The balance of the cellular cushion 302 is then free to deflect as it supports the load of a passenger, replacing springs. A suspended cellular cushion 302 also provides a dual cushioning method. A passenger may be supported and cushioned both by the deflection of the cellular cushion 302 and by the compression of the cellular cushion itself.

The cellular cushion 302 may be formed, molded, or otherwise made from any number of materials including, but not limited to, elastomers, polymers, and/or natural materials. The selection of a suitable material will depend upon the geometry of the cellular cushion, including the geometry, size, and distribution of the cells 304 and cell walls 306, the intended design loads, desired manufacturing processes, and any applicable regulatory requirements. The cellular cushion 302 is preferably made from a material that resists permanent deformation even under large displacements and repeated use. In certain embodiments, silicone may be an ideal material for the construction of the cellular cushion 302.

Ergonomic Head Rest

Figure 21:
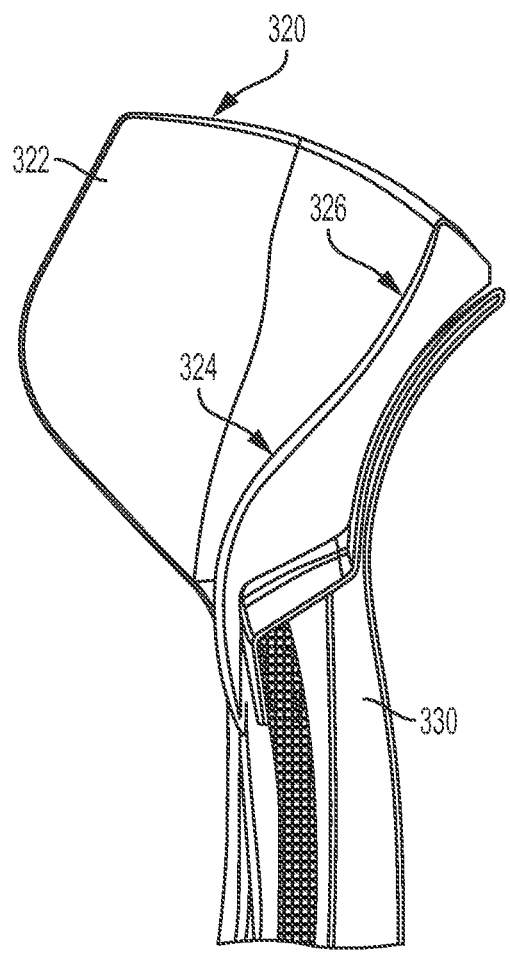
FIG. 21 is a sectional view of an ergonomic headrest.
Figure 22:
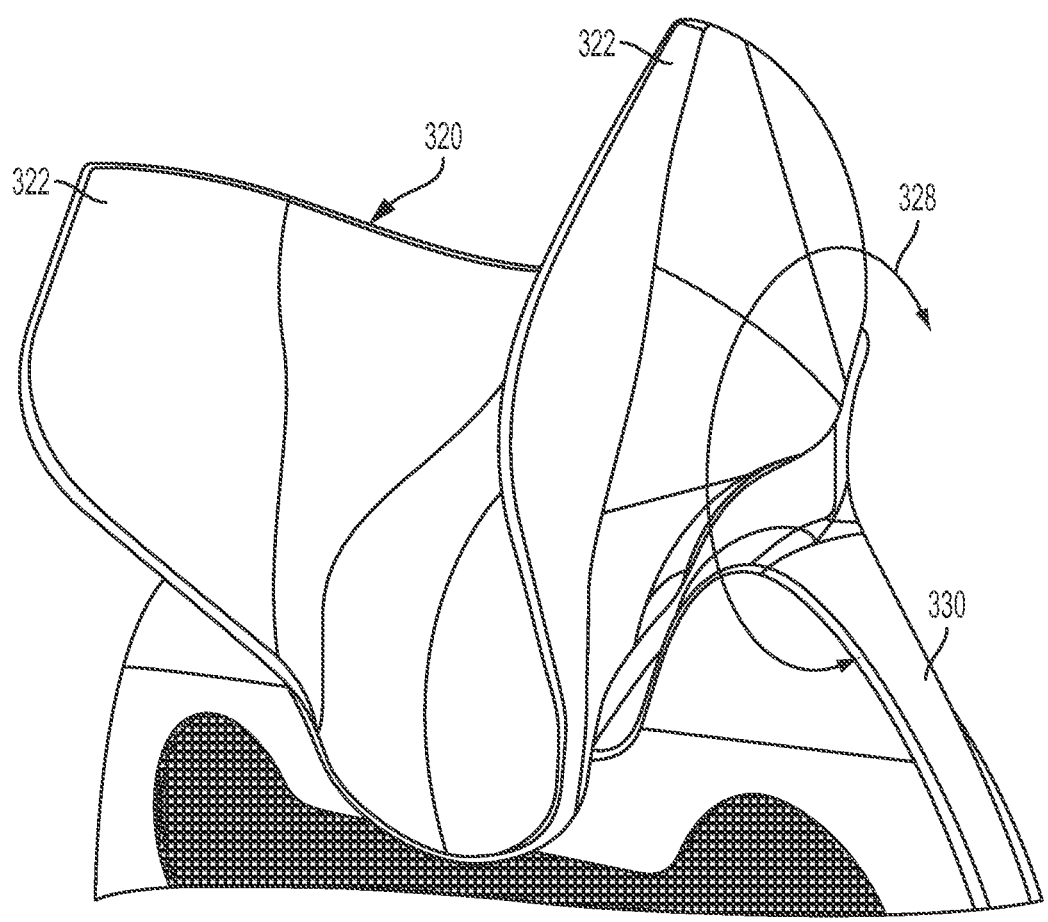
FIG. 22 is a perspective view of an ergonomic headrest.

In certain embodiments of the present invention, as shown in FIGS. 21 and 22, an ergonomic headrest 320 comprises side supports 322 and a neck support curvature 324 and an occipital pocket 326. The ergonomic headrest 320 is moveably affixed to the seat back 330. The headrest side supports 322 are configured to provide lateral support to a passenger, both during normal movement and while a passenger may be sleeping. Additionally, the side supports 322 may provide an enhanced feeling of privacy, and serve as mounting points for passenger entertainment, such as integrated speakers. The headrest is designed with a compound curve comprised of a neck support curvature 324 to support a passenger's neck, and an occipital pocket 326 to support the rear and base of the passenger's head. The neck support curvature 324 and occipital pocket 326 should be shaped based on statistical data to accommodate passengers ranging from the fifth to ninety-fifth statistical percentile for body size or shape. In order to provide enhanced support, particularly as the passenger seat moves between reclined and upright positions, in certain embodiments the ergonomic headrest 320 may rotate about a horizontal axis to articulate into a position that best supports the passenger's head and neck, as shown by rotation 328.

Figures 23A, 23B, 23C:
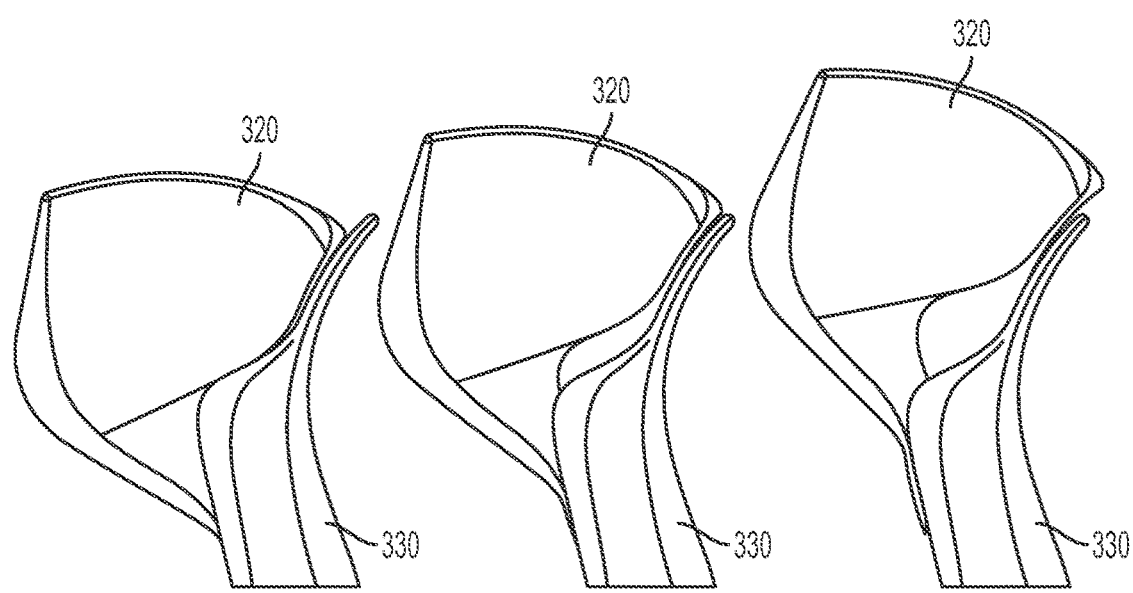
FIGS. 23A-23C are side elevation views of an ergonomic headrest in different translational positions.
Figure 24:
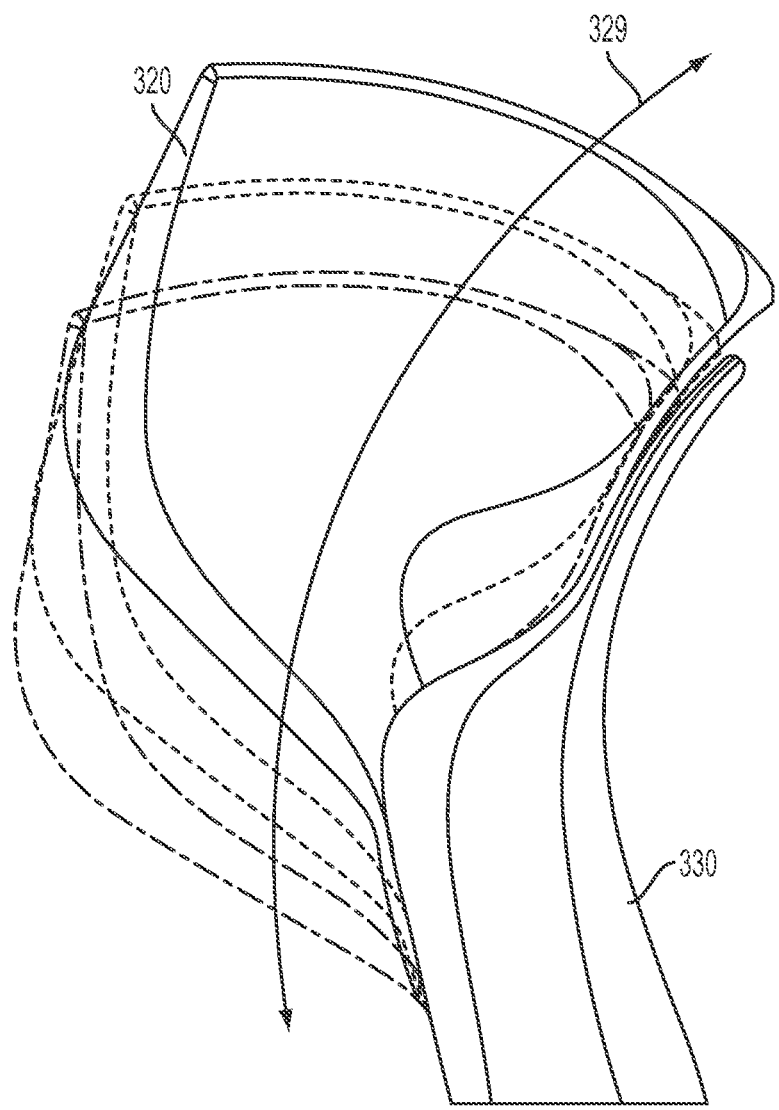
FIG. 24 is a side elevation view of an ergonomic headrest passing through a curved range of motion.

FIGS. 23A-24 provide side views of an ergonomic headrest 320 attached to a seat back 330 as it translates in a vertical direction to accommodate passengers that fall within the fifth to ninety-fifth statistical percentile for body size or shape. The relative amount of vertical translation of the ergonomic headrest 320 from a low position (FIG. 23A), through an intermediate position (FIG. 23B) and into an upper position (FIG. 23C) should take into account the height, torso size, neck size, and general posture of passengers within the fifth to ninety-fifth statistical percentile for body size or shape. In certain embodiments, the ergonomic headrest 320 may translate vertically through a linear motion. However, in some embodiments, the ergonomic headrest 320 may translate vertically through an arcing motion 329 to better accommodate passengers of varying size.

Referring to FIGS. 21-24, the ergonomic headrest 320 may be provided with additional padding, including foam, cushions, springs, or other devices to enhance passenger comfort. In certain embodiments, the ergonomic headrest 320 may include aesthetic additions, such as logos, coloring, or stylized fabrics as desired or required.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Low Rise Spreader and Rocking Seat Recline Motion

Figure 25:
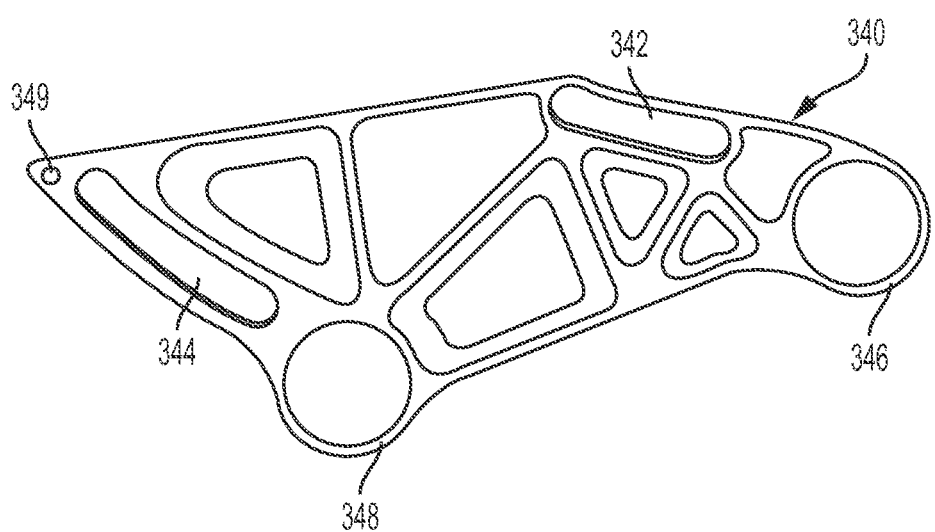
FIG. 25 is a side elevation view of a low-rise spreader.
Figure 26:
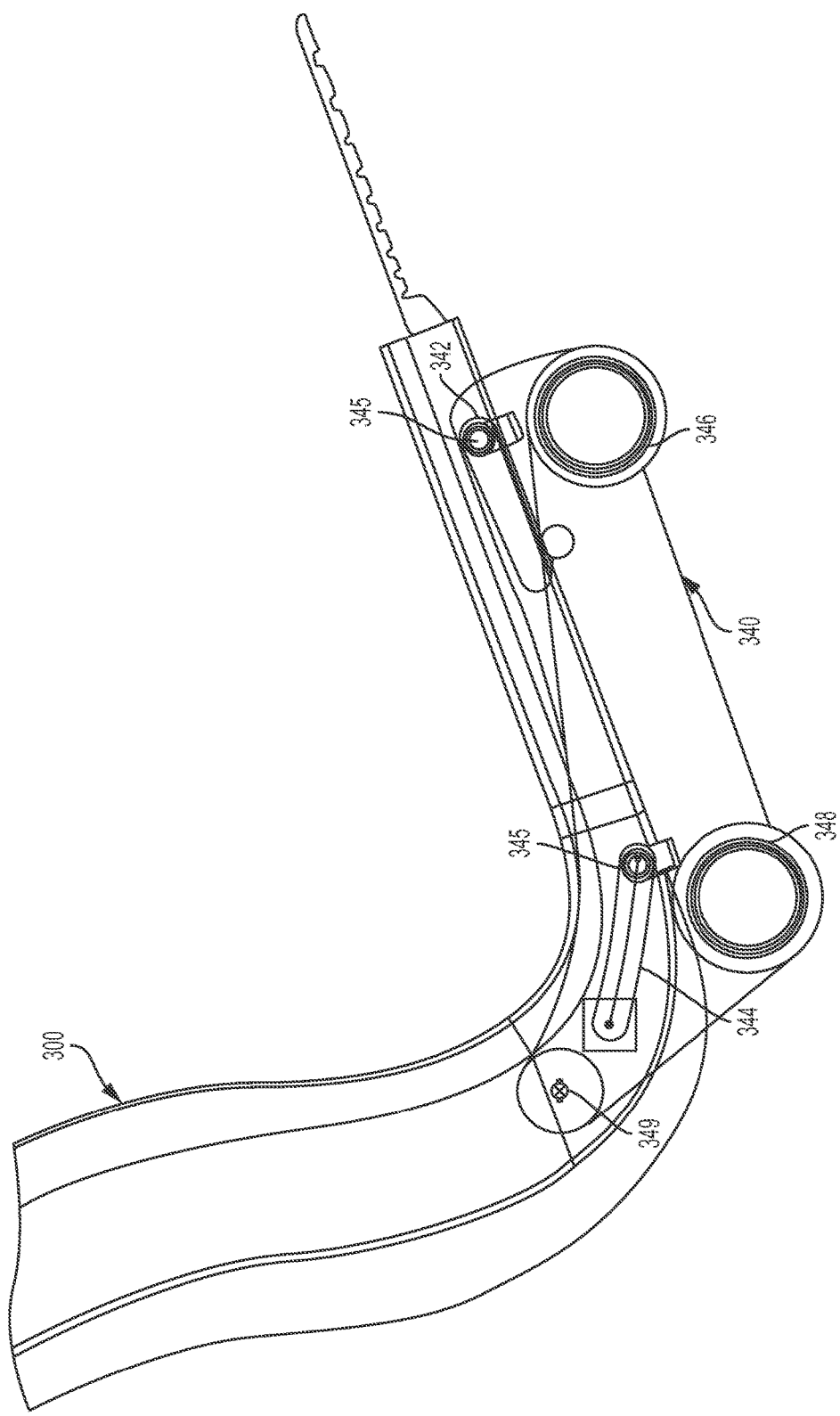
FIG. 26 is a side elevation view of a low-rise spreader with accompanying passenger seat.

In certain embodiments of the present invention, as shown in FIGS. 25 and 26, a low-rise spreader 340 comprises a forward motion track 342, an aft motion track 344, a forward seat tube aperture 346, an aft seat tube aperture 348, and a seatbelt attachment point 349. The motion tracks 342, 344 may be configured to accept rollers or other sliding members 345 from the passenger seat 300. In certain embodiments, the motion tracks 342, 344 will be disposed on the inside surface of the low-rise spreader 340 to eliminate or reduce potential pinch points.

The low-rise spreader 340 provides the attachment and structural connection between a passenger seat 300 and the seat tubes (not shown) or other structure of the vehicle or mode of transport. Traditional spreaders are characterized as generally L-shaped, wherein the structure of the spreader extends above the seat pan to provide structure for the armrests of the passenger seat 300. The traditional spreader design provides additional structure to hold the seat back, armrests, and seatbelt attachment. A low-rise spreader 340, typically, though not always, for use with a passenger seat 300 in which the armrests are mounted directly to the seat back, does not provide additional structure above the seat pan of the passenger seat 300. The resulting low-rise spreader 340 is smaller, lighter, a single piece design with integrated seat tube apertures 346, 348, and motion tracks 342, 344, and a seatbelt attachment point 349, which may be moved forward relative to a traditional spreader for an increase in passenger space. As the low-rise spreader 340 does not provide structure above the seat pan of a passenger seat 300, the low-rise spreader 340 may be particularly well suited to use with passenger seats 300 that feature monocoque or semi-monocoque seat backs and seat backs, which are fixed relative to the seat pan.

Still referring to FIGS. 25 and 26, the low-rise spreader 340 may include a forward motion track 342 and an aft motion track 344. The motion tracks 342, 344 are configured to displace the passenger seat 300 in a rocking motion wherein the passenger seat 300 is displaced downward and forward for recline. In certain embodiments, the forward motion track 342 and aft motion track 344 will be sloped in the same direction (i.e. downward from aft to forward, see FIG. 25). In some embodiments, the forward motion track 342 and aft motion track 344 will be sloped in opposite directions (FIG. 26). While unpowered recline of the passenger seat 300 may be preferable in certain applications, in some embodiments the rocking motion of the passenger seat may be assisted or accomplished through the use of springs, gas springs, or electric motors.

Figure 27:
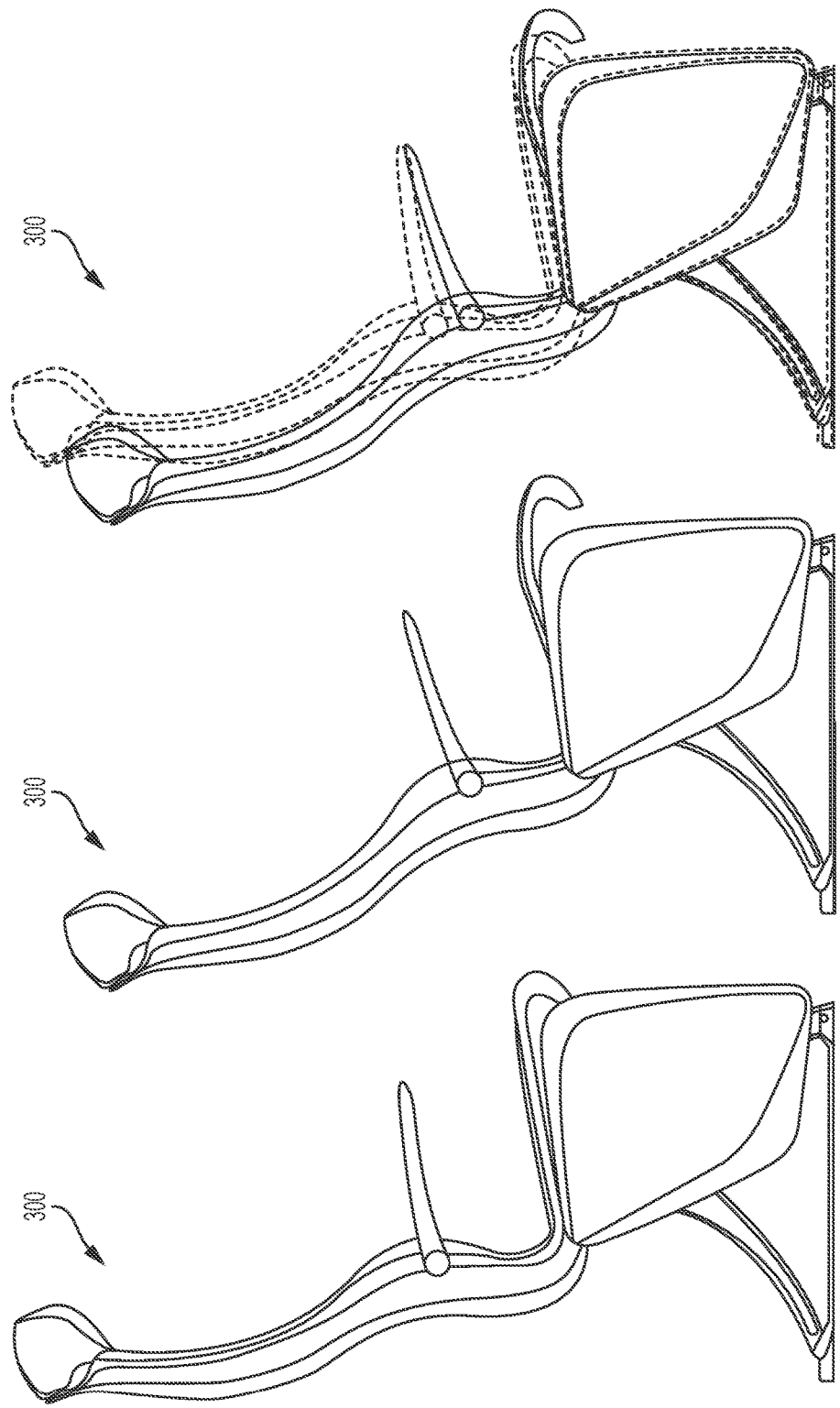
FIGS. 27A-27C are side elevation views of a reclining passenger seat passing through the upright and reclined positions.

FIGS. 27A-27C are schematic illustrations of a passenger seat 300 in an upright position (FIG. 27A), reclined position (FIG. 27B), and a comparison overlay of the upright and reclined positions (FIG. 27C). The rocking motion of the passenger seat 300 due to the motion tracks 342, 344 of the low-rise spreader 340 (not shown) may be seen in FIG. 27C. The rocking motion of the passenger seat 300 provides for recline equivalent to or greater than traditional recline mechanisms with less intrusion into the space of the aft passenger.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Seat Pan with Bullnose

Figure 28:
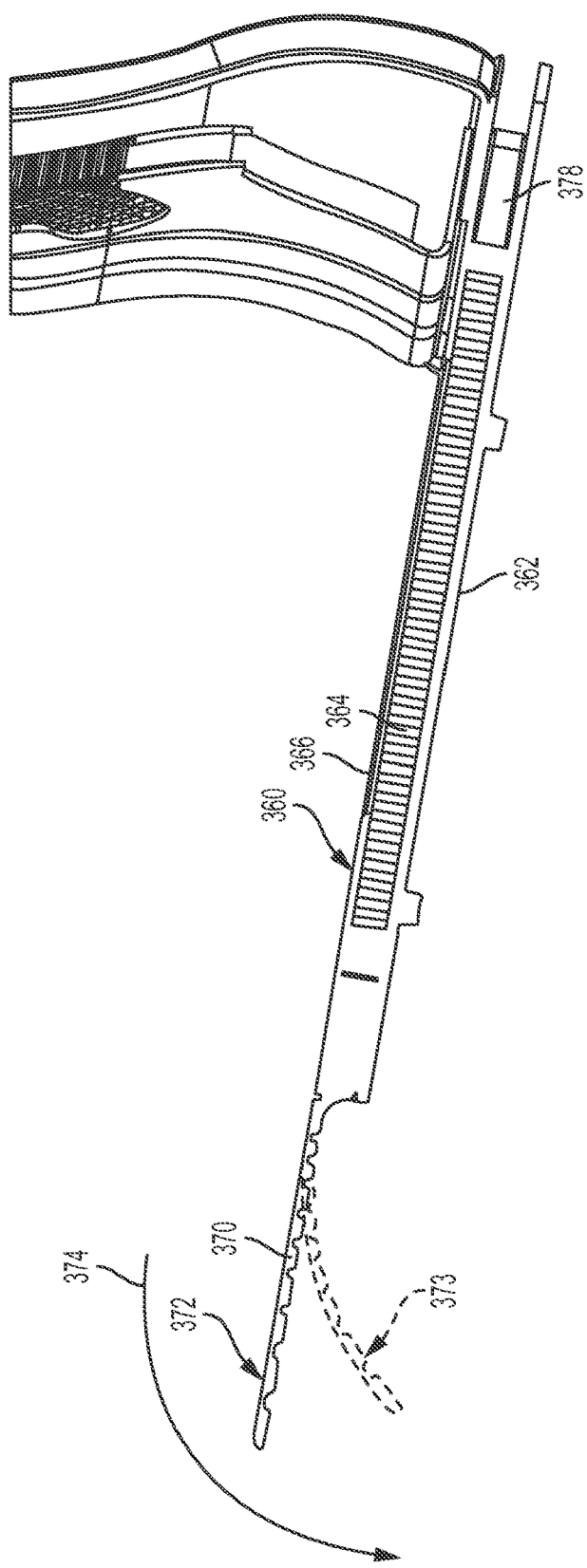
FIG. 28 is a sectional view of a seat pan with a bullnose.
Figure 29:
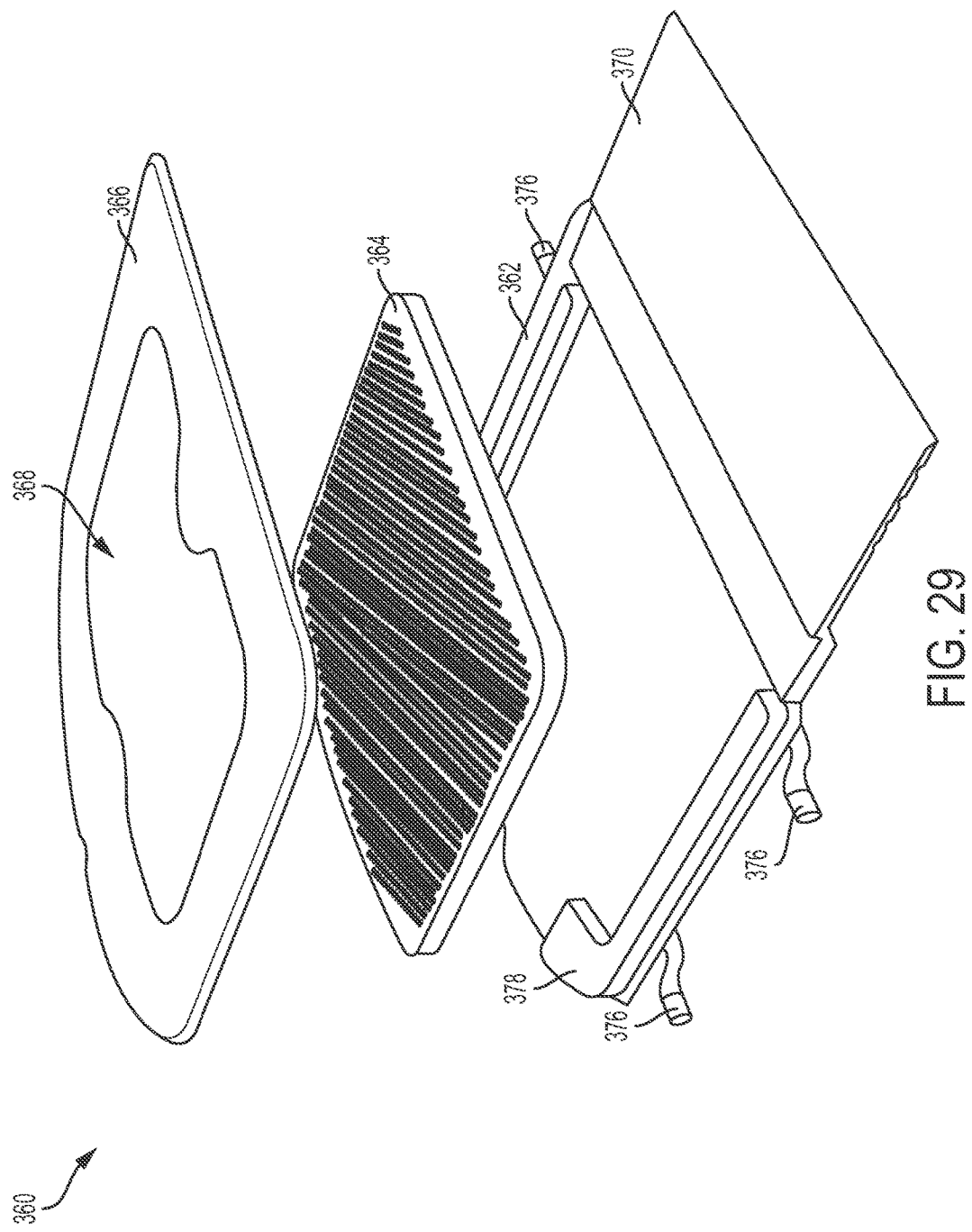
FIG. 29 is an assembly drawing of a seat pan with bullnose.

In some embodiments of the present invention, as shown in FIGS. 28 and 29, a seat pan 360 may comprise a support plate 362, a flexible core 364, a top plate 366, and a bullnose 370. The cushion core 364 may be sandwiched between the support plate 362 and the top plate 366, which has an aperture 368 and located by one or more cushion locators 378. The bullnose 370 is affixed to the forward edge of the seat pan 360, and is a flexible member comprised of a polymer, rubber, silicone, spring metal, or other material, which may deflect and repeatedly return to its original position. The bullnose 370 may move between a static position 372 and a flexed position 373 along a motion path 374. In certain embodiments, the seat pan may include one or more rollers 376, which may be configured to interact with a spreader or other seat structure and facilitate articulation or motion of the seat pan 360 from an upright position to a reclined position.

Still referring to FIGS. 28 and 29, the aperture 368 of the top plate 366 may be shaped and/or sized to allow forces from the tuberosity of the ischium ("ischial tuberosity") of a passenger to be passed through the aperture 368 such that the forces are absorbed and supported by the flexible core 364. The shape and size of the aperture 368 should be selected so that passengers, which range from the fifth to the ninety-fifth statistical percentile for body size or shape, will have their ischial tuberosity supported by the flexible core 364. The flexible core 364, which may be a cellular material as described above, may have anisotropic properties or may have differing levels of stiffness, cushion, or flex across different parts of the aperture 368 to provide relief from pressure points or other sources of passenger discomfort. In certain embodiments, the flexible core 364 may lock the passenger's ischial tuberosity in place to provide improved posture and comfort, even during long periods of sitting.

In some embodiments, the bullnose 370 of the seat pan 360 may be configured to provide varying support to the thighs of a passenger, particularly when the passenger reclines the seat. The bullnose 370, which may be formed from any elastomer, polymer, or other material that provides adequate flexibility and resilience to avoid permanent deformation, may flex between a static position 372 and a flexed position 373 to provide support and comfort to the passenger as the passenger moves, adjusts his or her seat, or changes position. In certain embodiments, the bullnose 370 may be adapted to flex so that a passenger's feet remain planted on the ground even when the seat pan 360 is reclined and the forward portion of the seat pan 360 may be angled away from the passenger compartment floor. The bullnose 370, similar to the seat pan 360, may be upholstered with additional fabric, cushioning, or other supports to provide a more aesthetically pleasing look and feel, and to improve passenger comfort.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Figure 30:
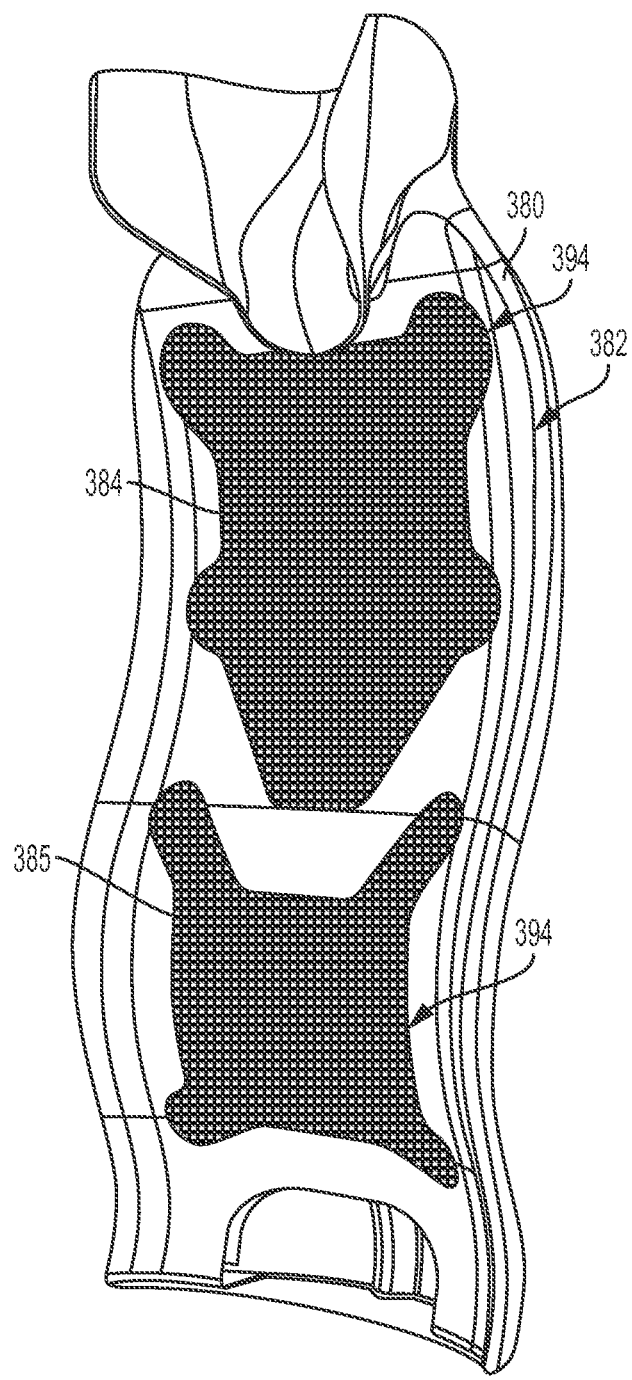
FIG. 30 is a perspective view of an ergonomic seat back.
Figure 31:
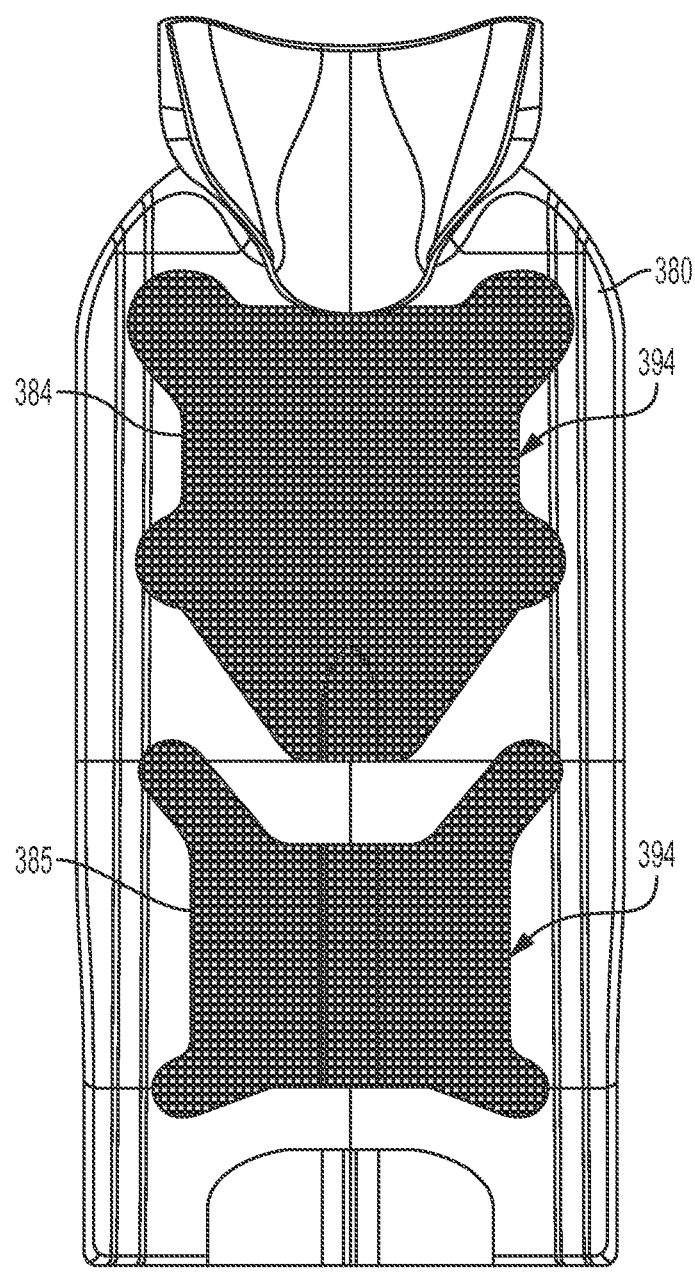
FIG. 31 is a front elevation view of an ergonomic seat back.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below Ergonomic Seat Back In certain embodiments of the present invention, as shown in FIGS. 30 and 31, an ergonomic seat back 380 may comprise a compound spinal curve 382, an upper forward panel aperture 384, and a lower forward panel aperture 385. The compound spinal curve 382 may be include a spinal shaped S-curve of varying radius extending along the length of the ergonomic seat back 380, and may also include a transverse concave curvature across the ergonomic seat back 380 to provide lateral support to a passenger. The spinal curve 382, and more generally the contours of the ergonomic seat back 380, should be shaped based on statistical data to accommodate passengers ranging from the fifth to ninety-fifth statistical percentile for body size or shape.

Still referring to FIGS. 30 and 31, the ergonomic seat back 380 may also include an upper forward panel aperture 384 and a lower forward panel aperture 385. Similar to the spinal curve 382, the upper and lower forward panel apertures 384, 385 should be sized and shaped based on statistical data so that the upper and lower forward panel apertures 384, 385 will transfer forces and pressure from passengers falling within the fifth to ninety-fifth statistical percentile for body size or shape to the suspension cushion 394.

Figure 32:
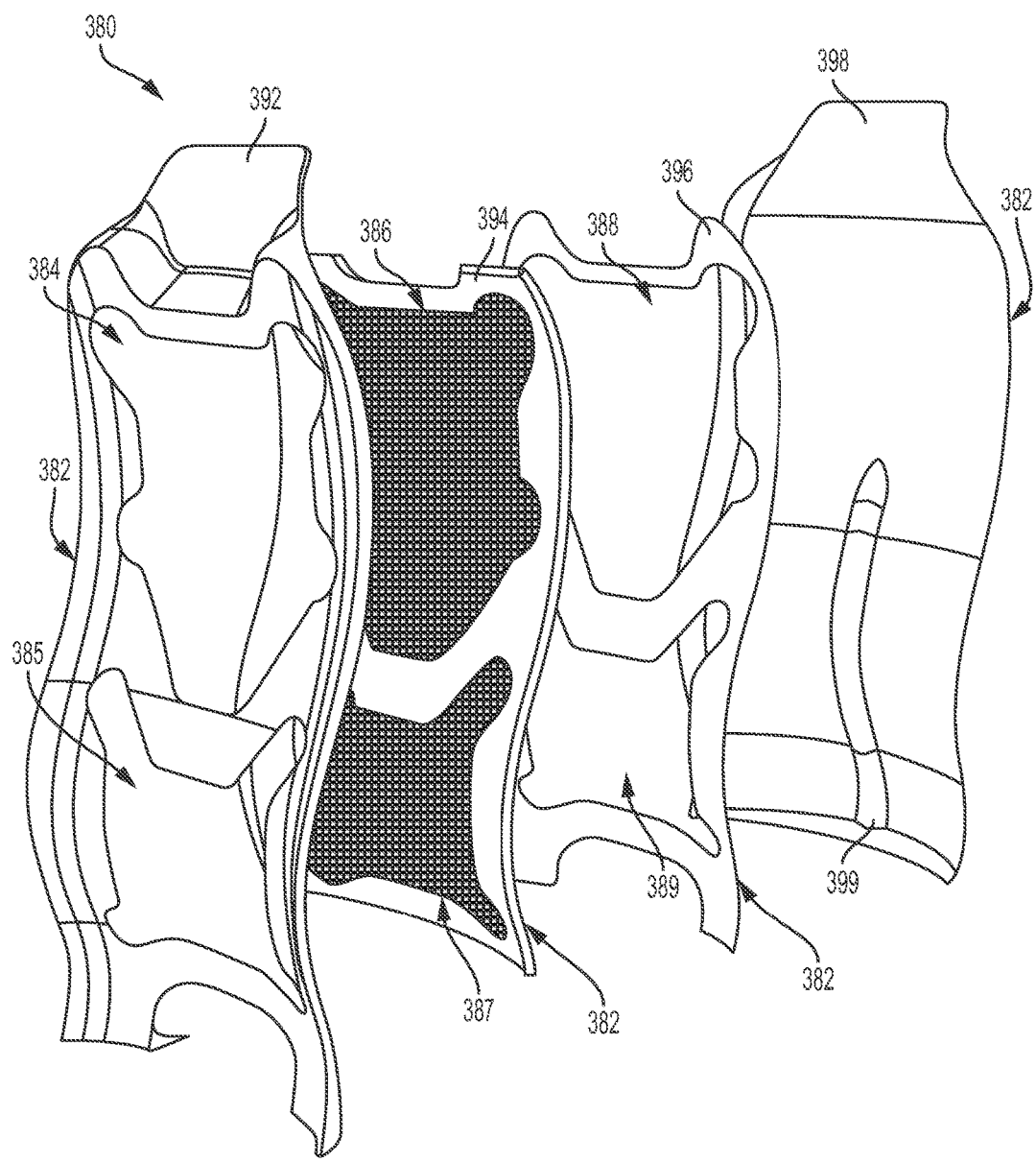
FIG. 32 is an assembly drawing of an ergonomic seat back.

FIG. 32 is an assembly drawing of an embodiment of an ergonomic seat back 380. The ergonomic seat back 380 may comprise a forward panel 392 and a aft panel 398. A suspension cushion 394 and suspension cushion retaining member 396 may be disposed between the forward panel 392 and the aft panel 398. When assembled, the forward panel 392 and aft panel 398 enclose a volume within which the suspension cushion 394 and suspension cushion retaining member 396 may be housed. In certain embodiments, the forward panel 392, aft panel 398, suspension cushion 394, and suspension cushion retaining member 396 may be shaped to include the spinal curve 382 of the ergonomic seat back 380. However, in some embodiments, the suspension cushion 394 may be molded flat and will take up the spinal curve 382 upon installation into the ergonomic seat back 380.

When the suspension cushion 394 is installed into the ergonomic seat back 380, the suspension cushion is mechanically fixed or bonded around its perimeter between the suspension cushion retaining member 396 and the forward panel 392. The suspension cushion 394 may then extend or deflect into the space between the suspension cushion and the aft panel 398. The deflection of the suspension cushion 394 provides two different types of cushioning. The compression of the suspension cushion 394 is complemented by its deflection into the open space enclosed by the forward panel 392 and the aft panel 398. The suspension cushion 394 may also provide additional means for adjusting the cushioning provided to a passenger at different areas of the ergonomic seat back 380 through use of a cellular material with anisotropic or variable properties as described above. The extra space contained within the ergonomic seat back 380, particularly in combination with a cellular suspension cushion 394, may also enhance passenger comfort by improving air circulation around the passenger, reducing the buildup of heat and moisture.

The forward panel 392 may comprise upper forward panel aperture 384 and lower forward panel aperture 385. These apertures 384, 385, which may be shaped and sized based on statistical data to accommodate passengers falling within the fifth to ninety-fifth statistical percentile for body size or shape, allow a transfer of forces from the passenger through the forward panel 392 and to the suspension cushion 394. Similarly, the suspension cushion 394 may comprise upper suspension cushion area 386 and lower suspension cushion area 387 that are shaped and sized to complement the upper and lower forward panel apertures 384, 385 of the forward panel 392. The suspension cushion retaining member 396 may also comprise an upper suspension cushion retaining member aperture 388 and a lower suspension cushion retaining member aperture 389. When assembled, the apertures 384, 385, 388, and 389 will align so that the upper and lower suspension cushion areas 386, 387 will be free to absorb forces from a passenger and expand through the suspension cushion retaining member 396 to provide both deflective and compressive cushioning. The aft panel 398 may not comprise any apertures, so as to eliminate the need for an additional aft seat cover, saving space, weight, and complexity. However, the aft panel 398 may comprise a stiffening depression or rib 399 to provide additional structural support to the ergonomic seat back 380. Still referring to FIG. 32, the suspension cushion retaining member 396 functions to locate and secure the suspension cushion 394 within the ergonomic seat back 380. The cushion retaining member may be affixed to the suspension cushion 394 and forward panel 392 with mechanical fasteners such as screws, bolts, rivets, or the like, or it may be bonded with adhesives, epoxy, glue, or another bonding agent. In certain embodiments, the suspension cushion 394 may be sonically or friction welded to the suspension cushion 394 and/or forward panel 392. The resulting ergonomic seat back 380 may be lighter, more compact, simpler to produce, and eliminate the need for springs or other support mechanisms. After assembly, the ergonomic seat back 380 may be upholstered with fabric and cushions as desired or required for additional comfort and aesthetic appearances.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Any of the above described structures, devices, or components may be combined with one another to provide a complete ergonomic seat design. For example, a monocoque or semi-monocoque seat back may be formed or otherwise manufactured with an ergonomic design incorporating a compound curves to fit persons who fall within the fifth to ninety-fifth statistical percentile for body size or shape. The monocoque or semi-monocoque seat back may also incorporate apertures and a cellular suspension cushion with self-adjusting lumbar support designed to alleviate pressure points or areas of discomfort. An ergonomic headrest may also be incorporated or added to the monocoque or semi-monocoque seat back. The above described seat back can be combined with a seat pan with bullnose incorporating a flexible core containing cellular material. The seat pan with bullnose may engage with a low-rise spreader that is configured to allow for a recline motion that displaces the passenger seat forward and down. This and any other combinations of the above described components may be used to provide customized seating as necessary for any particular application.

That which is claimed is:

1. A semi-monocoque seat back comprising:
a forward panel, wherein the forward panel comprises a forward concave face and a forward convex face;
an aft panel, wherein the aft panel comprises an aft concave face and an aft convex face;
an internal baffle disposed between and completely supported by the forward panel and the aft panel;
a forward panel mating perimeter; and
an aft panel mating perimeter, wherein the forward panel mating perimeter comprises complementary geometry to the aft panel mating perimeter, wherein:
the forward panel mating perimeter is affixed to the aft panel mating perimeter such that the forward concave face and the aft concave face substantially enclose a volume;
an entirety of the internal baffle is disposed within the volume; and
the internal baffle comprises a unitary component with (i) an upper portion at least partially disposed adjacent to a headrest area of the semi-monocoque seat back and (ii) a lower portion disposed between the upper portion and a pivot axis of the semi-monocoque seat back.

2. The semi-monocoque seat back of claim 1, wherein the forward panel mating perimeter and the aft panel mating perimeter form a butt joint.

3. The semi-monocoque seat back of claim 2, further comprising a backing member, wherein the backing member reinforces the butt joint of the forward panel mating perimeter and the aft panel mating perimeter.

4. The semi-monocoque seat back of claim 1, wherein the forward panel mating perimeter and the aft panel mating perimeter form at least one from the group of a lap joint, a splice joint, and a scarf joint.

5. The semi-monocoque seat back of claim 1, wherein the upper portion of the internal baffle comprises an integrated monitor surround.

6. The semi-monocoque seat back of claim 1, wherein the lower portion of the internal baffle comprises an integrated stowage pocket.

7. The semi-monocoque seat back of claim 1, further comprising at least one integrated armrest mounting point.

8. The semi-monocoque seat back of claim 1, wherein the forward panel comprises a composite.

9. The semi-monocoque seat back of claim 1, wherein:
the internal baffle is attached to both the forward panel and the aft panel;
the internal baffle is stationary; and
the internal baffle does not attach to a frame structure of the semi-monocoque seat back.

10. The semi-monocoque seat back of claim 1, wherein the aft panel comprises a composite.

11. The semi-monocoque seat back of claim 1, wherein:
the upper portion of the internal baffle comprises an upper outer flange defining an opening facing in a forward or aft direction, wherein the upper outer flange surrounds a solid panel on a forward side of the upper portion; and
the lower portion of the internal baffle comprises an lower outer flange defining an opening facing in the forward or aft direction, wherein the lower outer flange surrounds an opening in the lower portion.

12. The semi-monocoque seat back of claim 1, further comprising a foam fill within at least a portion of the volume, wherein the semi-monocoque seat back does not include a frame structure.

13. A semi-monocoque seat back comprising:
a structural skin comprising an exterior surface and an interior surface;
the interior surface of the structural skin defining a substantially enclosed volume; and
an internal baffle disposed within the substantially enclosed volume at a position spaced from a lower end of the structural skin, wherein:
the exterior surface of the structural skin is configured to provide a surface geometry of the semi-monocoque seat back;
the internal baffle comprises at least one from the group of an integrated monitor surround and an integrated stowage pocket; and
the structural skin completely supports the internal baffle relative to a pivot mechanism for pivoting the seat back and the structural skin substantially supports loads imposed on the semi-monocoque seat back.

14. The semi-monocoque seat back of claim 13, wherein the structural skin comprises a composite.

15. The semi-monocoque seat back of claim 13, wherein the internal baffle comprises a unitary component with (i) an upper portion at least partially disposed adjacent to a headrest area of the semi-monocoque seat back and (ii) a lower portion disposed between the upper portion and a pivot axis of the semi-monocoque seat back.

16. The semi-monocoque seat back of claim 13, wherein:
the internal baffle is attached to both a forward panel of the structural skin and to an aft panel of the structural skin;

the internal baffle is stationary; and the internal baffle does not attach to a frame structure of the semi-monocoque seat back.

17. The semi-monocoque seat back of claim 13, wherein the internal baffle comprises an outer flange in a forward or aft direction.

18. The semi-monocoque seat back of claim 13, further comprising a foam fill within at least a portion of the substantially enclosed volume, wherein the semi-monocoque seat back does not include a frame structure.

19. The semi-monocoque seat back of claim 13, further comprising at least one integrated armrest mounting point.

20. The semi-monocoque seat back of claim 1, wherein the aft panel comprises an outer flange extending in a forward direction that forms the aft concave face.

21. The semi-monocoque seat back of claim 1, wherein the forward panel comprises an outer flange extending in an aft direction that forms the forward concave face.

22. A semi-monocoque seat back comprising:

a forward panel;

an aft panel; and a one-piece internal baffle disposed between and completely supported by the forward panel and the aft panel, wherein:

the forward panel and the aft panel substantially enclose a volume;

an entirety of the internal baffle is disposed within the volume;

the internal baffle comprises at least one from the group of an integrated monitor surround and an integrated stowage pocket; and the internal baffle comprises an outer flange defining an opening facing in a forward or aft direction.

* * * * *